United States Patent [19]
Yoshioka et al.

[11] Patent Number: 5,988,144
[45] Date of Patent: Nov. 23, 1999

[54] ENGINE AIR-FUEL RATIO CONTROLLER

[75] Inventors: Yoshiaki Yoshioka, Sagamihara; Takao Kawasaki, Yamato; Masahiko Hashimoto, Isehara, all of Japan

[73] Assignee: Nissan Motor Co., Ltd., Yokohama, Japan

[21] Appl. No.: 09/008,500

[22] Filed: Jan. 16, 1998

[30] Foreign Application Priority Data

Jan. 16, 1997 [JP] Japan .................................. 9-005716

[51] Int. Cl.$^6$ ........................... F02D 41/04; B60K 41/12
[52] U.S. Cl. ........................ 123/493; 701/104; 701/110; 477/111
[58] Field of Search .................................. 123/325, 326, 123/492, 493; 701/104, 110; 477/111, 112, 113

[56] References Cited

U.S. PATENT DOCUMENTS

| | | | |
|---|---|---|---|
| 4,416,240 | 11/1983 | Matsuoka | 123/493 |
| 4,512,321 | 4/1985 | Yamato | 123/493 |
| 4,558,672 | 12/1985 | Boccadoro et al. | 123/493 |
| 4,655,179 | 4/1987 | Kashiwagura | 123/493 |
| 4,667,631 | 5/1987 | Kinugasa | 701/110 |
| 5,445,131 | 8/1995 | Kusunoki et al. | 123/493 |
| 5,762,043 | 6/1998 | Yoshioka et al. | 123/493 |

FOREIGN PATENT DOCUMENTS 3-111639  5/1991  Japan .

*Primary Examiner*—Willis R. Wolfe
*Attorney, Agent, or Firm*—Foley & Lardner

[57] ABSTRACT

In a vehicle engine, when an accelerator pedal is released and a vehicle speed has decreased after fuel injection by a fuel injector has stopped, a controller restarts fuel injection. An engine rotation speed decrease rate immediately prior to restarting fuel injection is calculated, and a restart fuel injection amount is set which is larger the larger the decrease rate. In this way, the torque generated by the engine quickly recovers even during rapid deceleration, while during gradual deceleration, the generated torque increases gradually so that a torque shock does not occur.

13 Claims, 17 Drawing Sheets

FIG. 16A PRIOR ART
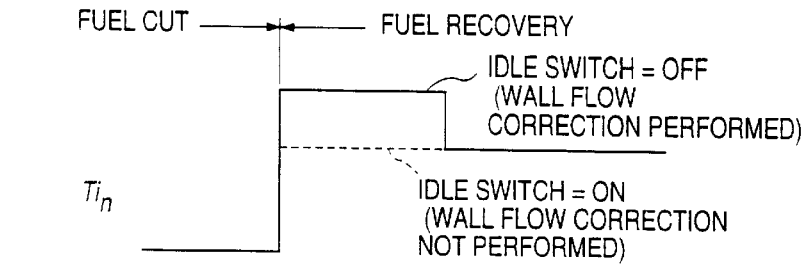
FIG. 16B PRIOR ART
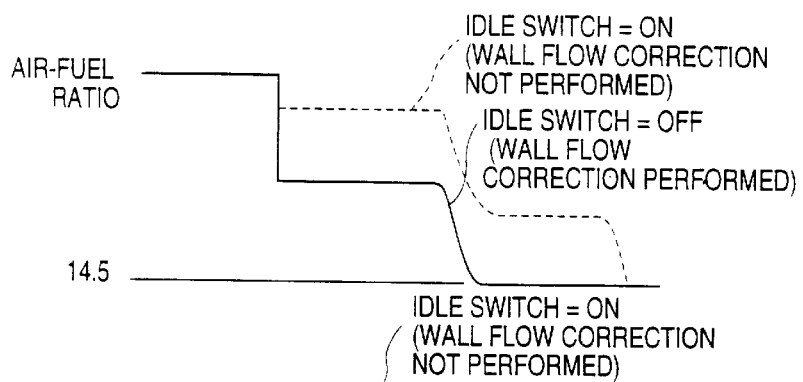
FIG. 16C PRIOR ART
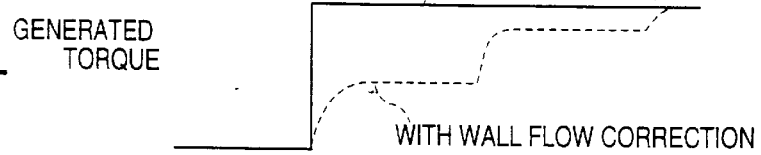
FIG. 16D PRIOR ART
FIG. 16E
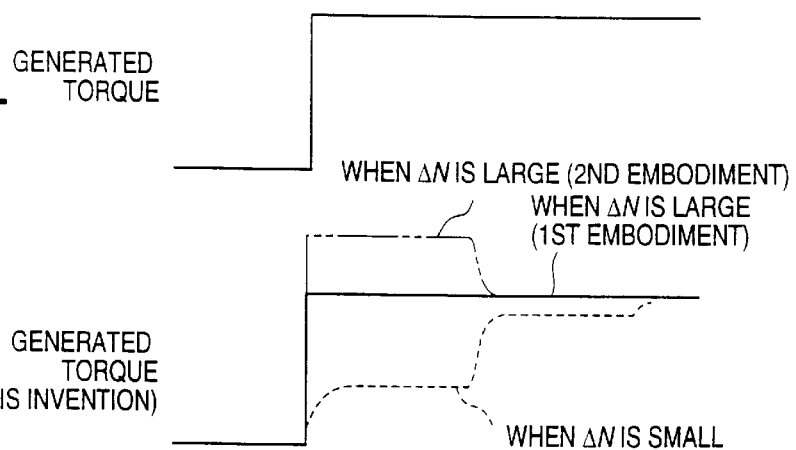
FIG. 16F

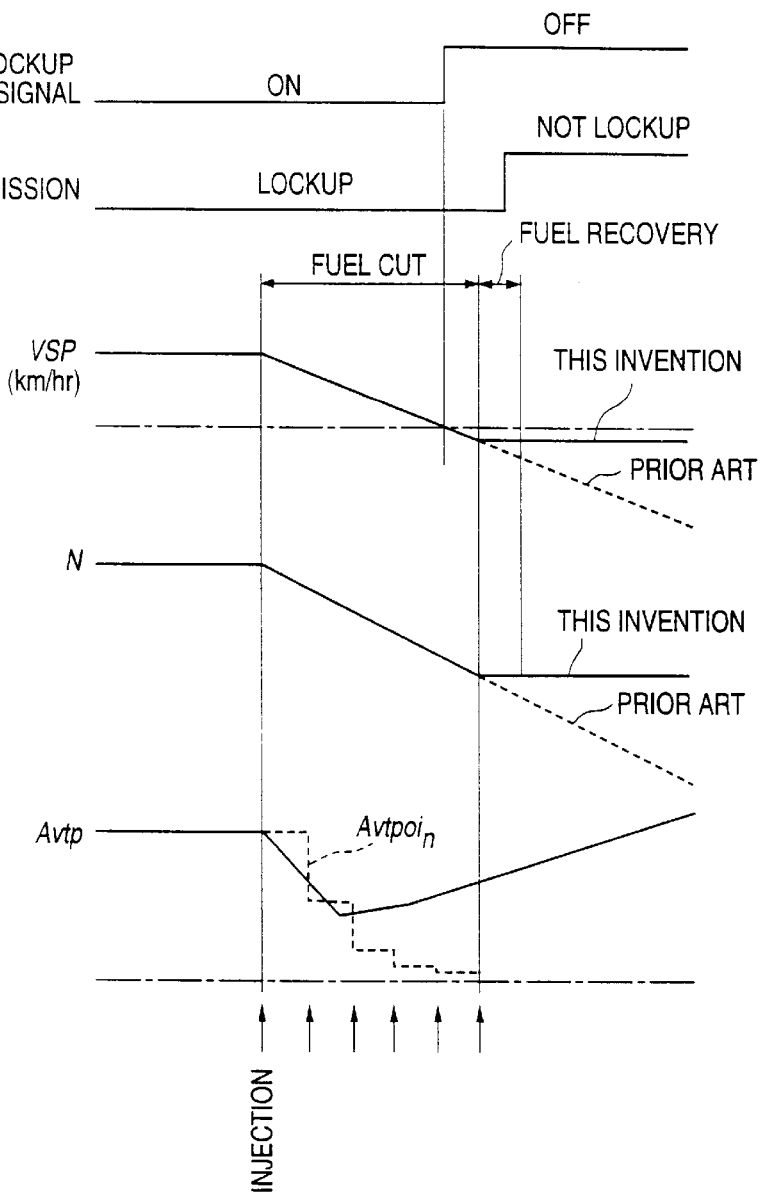

ENGINE AIR-FUEL RATIO CONTROLLER

The contents of Tokugan Hei 9-5716, with a filing date of Jan. 16, 1997 in Japan, are hereby incorporated by reference.

1. Field of the Invention

This invention relates to an engine air-fuel ratio controller for a vehicle.

2. Background of the Invention

In a vehicle fitted with an automatic transmission, when the engine rotation speed is equal to or greater than a predetermined value after releasing the accelerator pedal and the vehicle speed is higher than a predetermined value, "fuel cut" is performed wherein fuel injection to the engine is stopped. When the vehicle speed has decreased to the predetermined value or less without stepping on the accelerator-pedal or the accelerator pedal is again depressed to re-accelerate, fuel injection to the engine is resumed, and "fuel recovery", i.e. resumption of fuel supply to the engine, is performed.

A deviation from a target value of air-fuel ratio during acceleration or deceleration of the engine is due to wall flow. Wall flow is a phenomenon wherein fuel adheres to an intake manifold or an intake port of the engine, and flows into the cylinder over the wall surface as a liquid. For example, in air-fuel ratio control of an engine, a wall flow correction is applied which corrects for oversupply or undersupply of fuel due to this wall flow.

This wall flow correction however is not limited to acceleration and deceleration, but is performed also during fuel cut, which brings a major change in wall flow.

Wall flow may be a flow with a comparatively slow response wherein fuel does not flow directly into cylinder, or a flow with a comparatively fast response wherein fuel does flow directly into cylinder. Tokkai Sho 3-111639 published by the Japanese Patent Office in 1991 sets a transition correction amount Kathos as a correction related to slow response wall flow, and a cylinder-specific increase/decrease correction amount $Chos_n$ and cylinder-specific asynchronous injection pulse width $Injset_n$ are introduced as correction amounts related to fast response wall flow.

When such wall flow correction is performed, for example, a decrease amount of wall flow during fuel cut is predicted, and the air-fuel ratio at the start of fuel recovery is made to approach the stoichiometric air fuel ratio by increasing fuel corresponding to this decrease amount during fuel recovery.

In the case of re-acceleration, this type of wall flow correction is performed in order to obtain a quick response of the engine, and when fuel supply is resumed due to decrease of engine rotation speed without stepping on the accelerator pedal, a sudden increase of the engine output torque accompanying the resumption of fuel supply is avoided by not performing this wall flow correction. This is because a sudden increase of output torque when the accelerator pedal is not depressed gives the driver a sense of discomfort.

However, when engine rotation speed decreases without stepping on the accelerator pedal, it may decrease gradually or suddenly depending on vehicle running conditions. When wall flow correction is not performed in the latter case, it may occur that the engine rotation speed falls excessively, or the engine stops before engine speed recovers to a predetermined value due to the resumption of fuel supply.

SUMMARY OF THE INVENTION

It is therefore an objective of this invention to stabilize the engine running state when fuel supply is resumed according to decrease of engine rotation speed without giving discomfort to the driver.

In order to achieve the above object, this invention provides an air-fuel ratio controller for controlling a fuel injection amount of a fuel injector of a vehicle engine.

The controller comprises a sensor for detecting an engine rotation speed, and a microprocessor. The microprocessor is programmed to stop fuel injection from the fuel injector under a predetermined condition, calculate an engine rotation speed decrease rate from the engine rotation speed, determine whether or not a predetermined fuel injection restart condition is satisfied after fuel injection has been stopped, set a restart injection amount to be larger the larger the decrease rate, and control the fuel injector when the fuel injection restart condition is satisfied so that injection is restarted with the restart injection amount.

It is preferable that the controller further comprises an idle switch for detecting an engine idle running state and a sensor for detecting a vehicle speed, and the predetermined fuel injection restart condition comprises a case where the engine is in the idle running state and the vehicle speed is less than a predetermined value.

If the engine is coupled with an automatic transmission comprising a lockup mechanism for directly transferring an engine output torque to the transmission, it is preferable that the microprocessor is further programmed to increase the restart fuel injection amount when the lockup mechanism is activated.

This invention also provides an air-fuel ratio controller for a vehicle engine in which the injector respectively injecting fuel to a plurality of cylinders.

The controller comprises a microprocessor programmed to calculate a basic fuel injection amount of the fuel injector, calculate a first correction amount related to a first wall flow, calculate an engine load equivalent amount for a specific cylinder based on the basic injection amount, calculate a variation rate of the engine load equivalent amount, calculate a second correction amount related to a second wall flow having a faster response than the first wall flow, based on the variation rate, calculate a cylinder-specific injection amount by correcting the basic injection amount by a first correction amount and a second correction amount, control the fuel injector such that the cylinder-specific injection amount is injected for the cylinder in synchronism with the engine rotation, stop the fuel injection by the fuel injector into the cylinder under a predetermined condition, store the engine load equivalent amount immediately prior to when fuel injection is stopped in the cylinder, decrease the stored engine load equivalent amount in a predetermined proportion with the fuel injection timing during the time that fuel injection is stopped, determine whether or not a predetermined fuel injection restart condition is satisfied after fuel injection has stopped, calculate the second correction amount from the difference between the present engine load equivalent amount and the stored engine load equivalent amount, when the fuel injection restart condition is satisfied, calculate an engine rotation speed decrease rate when the fuel injection restart condition is satisfied, modify the second correction amount such that the restart fuel injection amount decreases the smaller is the decrease rate, calculate the restart fuel injection amount when the fuel injection restart condition is satisfied from the basic injection amount, the first correction amount and the modified second correction amount, and control the fuel injector so that injection is restarted with the restart fuel injection amount.

It is preferable that the controller further comprises an idle switch for detecting an engine idle running state and a sensor for detecting a vehicle speed; and the predetermined fuel injection restart condition comprises a case where the engine is in the idle running state and the vehicle speed has decreased to a predetermined or lower value.

If the engine is coupled with an automatic transmission comprising a lockup mechanism for directly transferring an engine output torque to the transmission, it is preferable that the microprocessor is programmed to further increase the restart fuel injection amount when the lockup mechanism is activated.

It is also preferable that the controller further comprises a sensor for detecting an engine cooling water temperature, and the microprocessor is further programmed to correct the second correction amount based on the cooling water temperature.

This invention also provides an air-fuel ratio controller a microprocessor programmed to calculate a basic fuel injection amount of the fuel injector, control the fuel injector such that an injection amount based on the basic fuel injection amount is injected for each cylinder in synchronism with the engine rotation, calculate an engine load equivalent amount for a specific cylinder based on the basic injection amount, calculate a variation rate of the engine load equivalent amount, determine whether or not the engine is in a rapid acceleration state based on the load variation rate, calculate an asynchronous injection amount for the cylinder based on the load variation rate when the engine is in the rapid acceleration state, control the fuel injector such that the asynchronous injection amount is injected immediately after the calculation of the asynchronous injection amount, stop fuel injection from the fuel injector under a predetermined condition, store the engine load equivalent amount immediately prior to when fuel injection is stopped, decrease the stored engine load equivalent amount in a predetermined proportion with the fuel injection timing during the time that fuel injection is stopped, determine whether or not a predetermined fuel injection restart condition is satisfied after fuel injection has stopped, calculate the asynchronous injection amount from the difference between the present engine load equivalent amount and the stored engine load equivalent amount, when the fuel injection restart condition is satisfied, calculate an engine rotation speed decrease rate when the fuel injection restart condition is satisfied, and modify the asynchronous injection amount such that the asynchronous injection amount is decreased the smaller is the decrease rate.

It is preferable that the microprocessor is further programmed to predict a correction amount for the cylinder comprising a wall flow decrease amount due to rapid acceleration of the engine added to a fuel oversupply amount due to the asynchronous injection after the rapid acceleration state, and subtract the correction amount from a synchronous injection amount performed immediately following the asynchronous injection.

It is also preferable that the controller further comprises an idle switch for detecting an engine idle running state and a sensor for detecting a vehicle speed, and the predetermined fuel injection restart condition comprises a case where the engine is in the idle running state and the vehicle speed has decreased to a predetermined or lower value.

If the engine is coupled with an automatic transmission comprising a lockup mechanism for directly transferring an engine output torque to the transmission, it is also preferable that the microprocessor is further programmed to increase the asynchronous injection amount when the lockup mechanism is activated.

It is also preferable that the controller further comprises a sensor for detecting an engine cooling water temperature, and the microprocessor is further programmed to correct the asynchronous injection amount based on the cooling water temperature.

This invention also provides an air-fuel ratio controller for controlling a fuel injection amount of a fuel injector of a vehicle engine, comprising a mechanism for detecting an engine rotation speed, a mechanism for stopping fuel injection from the fuel injector under a predetermined condition, a mechanism for determining whether or not a predetermined fuel injection restart condition is satisfied after fuel injection has been stopped, a mechanism for calculating an engine rotation speed decrease rate when the fuel injection restart condition is satisfied, a mechanism for setting a restart injection amount to be larger the larger the decrease rate, and a mechanism for controlling the fuel injector so that injection is restarted with the restart injection amount.

The details as well as other features and advantages of this invention are set forth in the remainder of the specification and are shown in the accompanying drawings.

BRIEF DESCRIPTION OF THE DRAWINGS

FIGS. 16A–16F are timing charts which compare an output torque during fuel recovery according to the air-fuel ratio controller and according to a prior art controller.

FIGS. 19A–19E are timing charts showing the control performed during fuel recovery by the air-fuel ratio controller according to the second embodiment.

DESCRIPTION OF THE PREFERRED EMBODIMENTS

Figure 1:
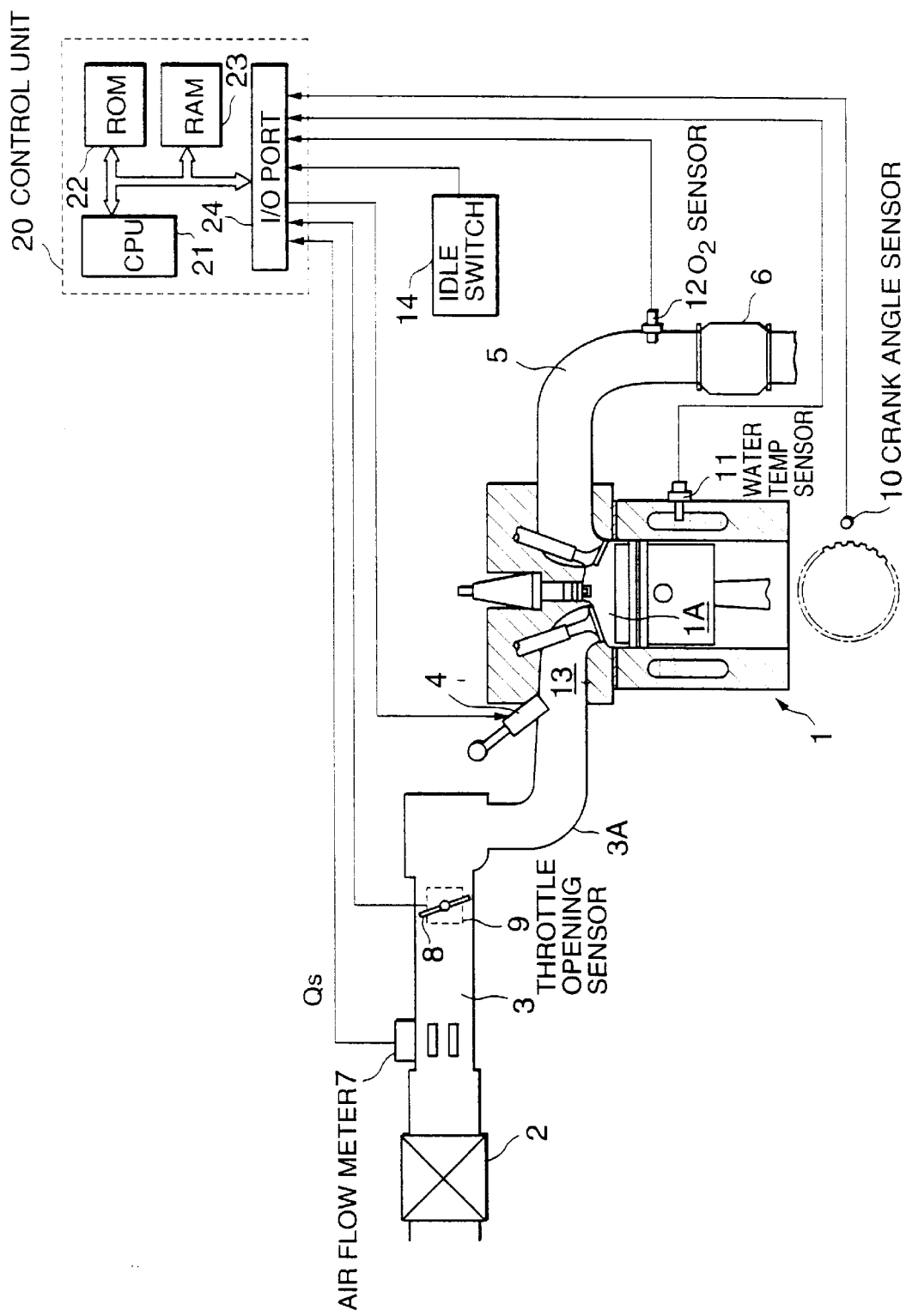
FIG. 1 is a schematic diagram of an air-fuel ratio controller according to this invention.

Referring to FIG. 1 of the drawings, intake air for a four-stroke cycle, six cylinder engine 1 for a vehicle passes via an intake passage 3 and intake manifold 3A from an air cleaner 2, and is supplied to a combustion chamber 1A.

Based on an injection signal from a control unit 20, fuel is injected toward an intake port 13 of the engine 1 from a fuel injector 4. The control unit 20 controls a fuel injection amount by an injection signal so as to achieve a predetermined air-fuel ratio according to the running conditions of the engine 1. The control unit 20 comprises a microcomputer comprising a CPU 21, ROM 22, RAM 23 and I/O port 24.

A throttle 8 for increasing and decreasing the intake air amount is provided in the intake passage 3. An air flow meter 7 for detecting the intake air amount and a throttle opening sensor 9 for detecting an opening of the throttle 8 are also provided.

Exhaust from the engine 1 is discharged by an exhaust passage 5. A three-way catalytic converter 6 for removing toxic substances in the exhaust is provided in the exhaust passage 5. An $O_2$ sensor 12 for detecting an air-fuel ratio of the air-fuel mixture supplied to the combustion chamber 1A from the oxygen density of the exhaust is provided upstream of the three-way catalytic converter 6.

Signals from the air flow meter 7, throttle opening sensor 9 and $O_2$ sensor 12 are input into the control unit 20. A signal from a crank angle sensor 10 which outputs a Ref signal corresponding to specific rotation positions of the engine 1 and a Pos signal corresponding to every 1 degree rotation of the engine 1, a signal from a water temperature sensor 11 for detecting a cooling water temperature of the engine 1, and a signal from an idle switch 14 for detect an idle state of the engine 1, are also input to the control unit 20.

Based on these signals, the control unit 20 calculates a fuel injection amount of the injector 4, and a wall flow correction is added to the fuel injection amount during acceleration/deceleration of the engine 1.

The deviation from a target value of the air-fuel ratio during acceleration/deceleration of the engine is related to "wall flow", wherein fuel which adheres to an intake air manifold 3A and intake port 13 flows into the cylinder over the wall as a liquid. In a steady running state, a fixed wall flow amount flows into the combustion chamber 1A with a fixed time lag relative to the air-fuel mixture flowing directly into the combustion chamber 1A, however during acceleration/deceleration, the wall flow amount changes, an oversupply or undersupply temporarily occurs in the fuel supply amount to the combustion chamber 1A, and this causes the air-fuel ratio to vary. The control unit 20 corrects oversupply and undersupply of fuel caused by this wall flow. The wall flow correction is not limited to acceleration/deceleration, but is also applied during engine start-up or during fuel cut, which causes a large change of wall flow amount.

As described hereabove, wall flow may be a flow with a comparatively slow response wherein fuel does not flow directly into cylinder, or a flow with a comparatively fast response wherein fuel does flow directly into cylinder. The control unit 20 applies a transient correction amount Kathos as a correction amount for slow response wall flow, and applies a cylinder-specific increase/decrease correction amount $Chos_n$ and cylinder-specific asynchronous injection pulse width Injsetn as correction amounts for fast response wall flow. For example, immediately after fuel recovery, Kathos is applied as shown in FIG. 13D for a relatively long time, and $Chos_n$, $Injset_n$ are applied for a short time.

This control performed by the control unit 20 will now be described referring to flowcharts. Wall flow correction itself is well known from the above-mentioned Tokkai Hei 3-111639.

Figures 2A, 2B:
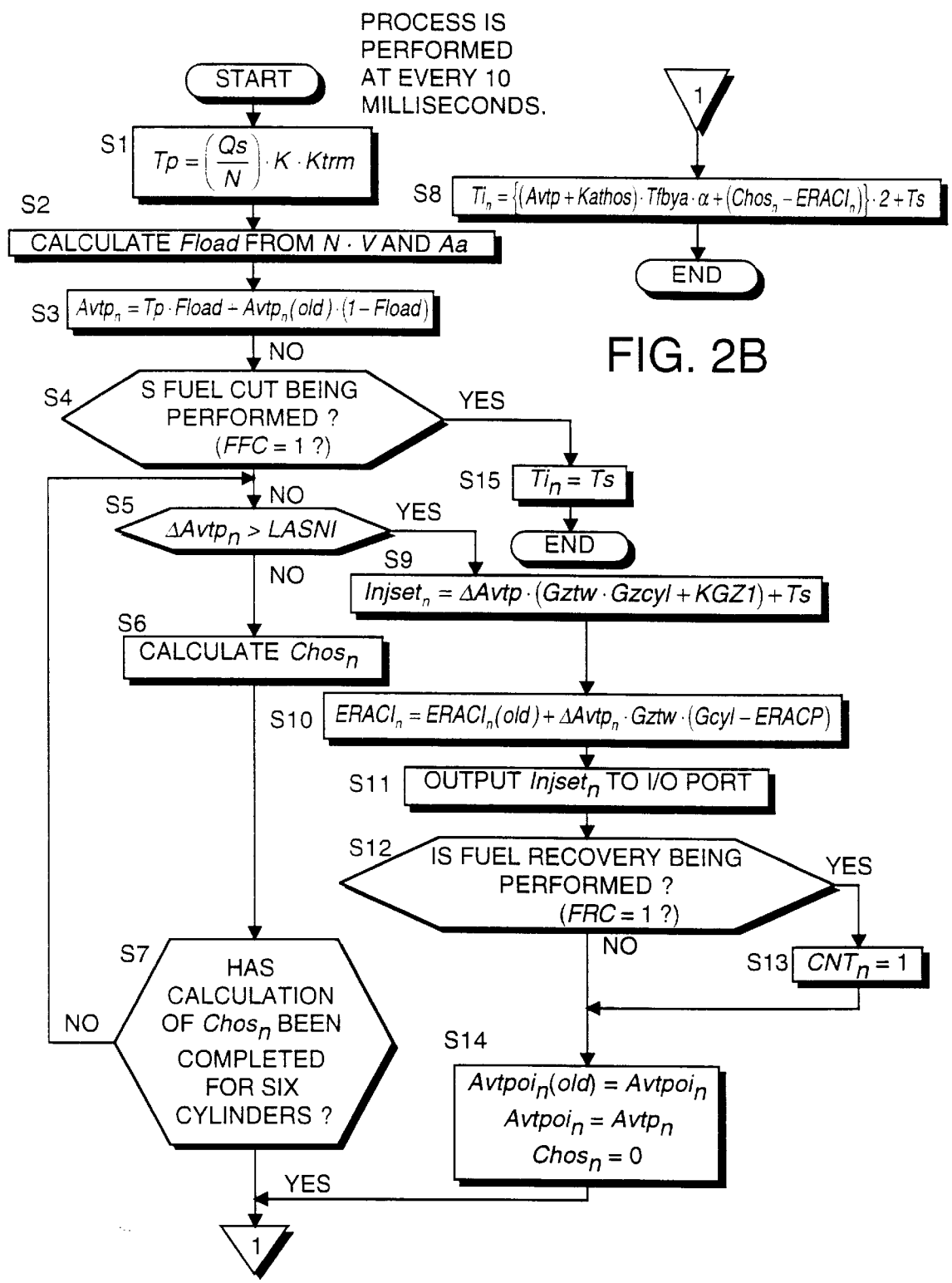
FIGS. 2A and 2B are flowcharts describing a process of calculating a cylinder-specific fuel injection pulse width $Ti_n$ performed by an air-fuel ratio controller.

The flowcharts of FIGS. 2A and 2B show a calculation of a cylinder-specific synchronism injection pulse width $Ti_n$ [msec] and a cylinder-specific asynchronous injection pulse width $Injset_n$[msec] and the process of performing asynchronous injection. Specifically, this process is performed at a fixed interval of 10 milliseconds.

Figure 12:
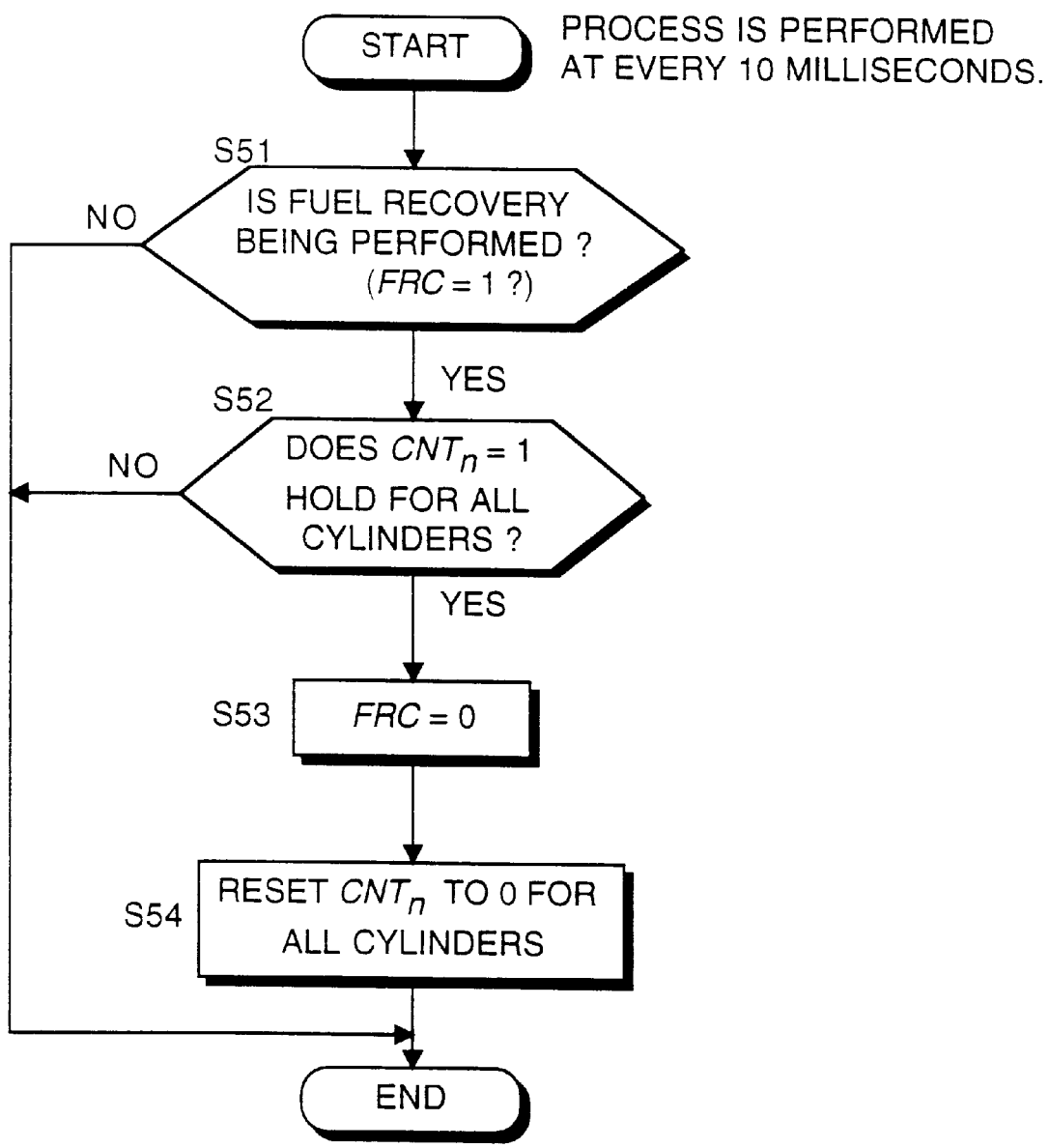
FIG. 12 is a flowchart describing a process for determining an end of a fuel recovery condition performed by the air-fuel ratio controller.

In FIGS. 2A, 2B and FIG. 8, FIG. 12 described hereafter, a cylinder number n used to distinguish the cylinder is appended to a cylinder-specific value at the end of a symbol. For example, $\Delta Avtp_n$ of FIGS. 2A and 2B, $Chos_n$, $Ti_n$, $Injset_n$, $ERACI_n$, $ERACI_n(old)$, $CNT_n$, $Avtpoi_n$, $Avtpoi_n$ (old), $Avtpoi_n$ of FIG. 8, $Avtpoi_n(old)$, and $CNT_n$, $ERACI_n$, $CNT_n$ of FIG. 12 are examples of this.

Figure 20:
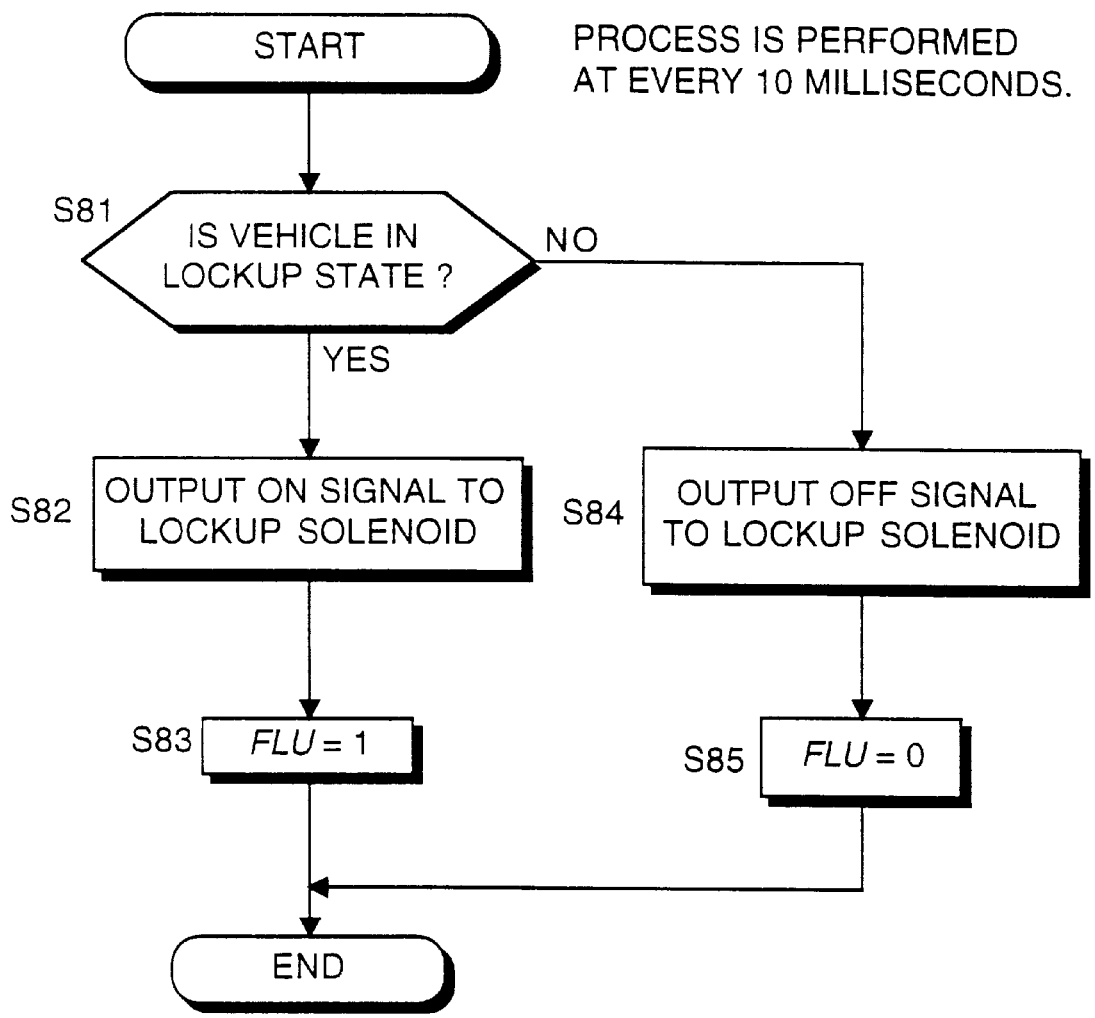
FIG. 20 is a flowchart describing a lock up region determining process performed during fuel recovery by the air-fuel ratio controller according to the second embodiment.

Symbols which refer to numerical values such as $CNT_n$ of FIGS. 2A, 2B, 8 and 12 are initialized to 0 at engine startup unless there is a reason to the contrary. Also, symbols showing flags, such as FFC, FRC of FIGS. 2A, 2B, 8 and 11, FRC of FIGS. 12, 14 and 17, and FLU of FIG. 20, are reset to "0" at engine start-up unless there is a reason to the contrary.

Referring now to FIGS. 2A and 2B of the drawings, in a step S1, an intake air flowrate Qs [g/sec] which is obtained from the output signal of the air flow meter 7 and a basic injection pulse width Tp [msec] from the engine rotation speed N [rpm] obtained by the output signal of the crank angle sensor 10, are calculated by the following expression (1).

$$Tp = \left(\frac{Qs}{N}\right) \cdot K \cdot Ktrm \tag{1}$$

where,

K=constant,

Ktrm=trimming coefficient.

K is a constant for obtaining an air-fuel mixture having a stoichiometric air-fuel ratio, and Ktrm is a unique coefficient representing the flowrate characteristics of the injector 4.

In a step S2, a weighted average coefficient Fload [%] is calculated by looking up a predetermined map from a product N·V of the engine rotation speed N and cylinder volume V [cc], and a total flowpath surface area Aa [cm$^2$] of the throttle 8. The total flowpath surface area Aa [cm$^2$] is obtained by adding a flowpath surface area of an idle adjusting valve [cm$^2$] or an air regulator to the flowpath surface area [cm$^2$] of the throttle 8.

In a step S3, a cylinder air volume equivalent pulse width Avtp [msec] is calculated by the next expression (2).

$$Avtp_n = Tp \cdot Fload + Avtp_n(\text{old}) \cdot (1 - Fload) \qquad (2)$$

where, $Avtp_n(\text{old})$=value of $Avtp_n$ on immediately preceding occasion.

Herein, $Avtp_n$ is a value representing the load of the engine 1. The value of $Avtp_n(\text{old})$ is initialized to 0 at start-up together with $ERACI_n(\text{old})$, $Avtpoi_n(\text{old})$, and $N(\text{old})$ described hereafter.

In a step S4, it is determined from a flag FFC whether or not fuel cut is being performed. When FFC=1, it is determined that fuel cut is being performed, the routine proceeds to a step S15 where an ineffectual pulse width Ts is put into the cylinder-specific synchronism injection pulse width Tin, and the process is terminated.

When FFC≠1, it is determined that fuel cut is not being performed, and the routine proceeds to a step S5 and subsequent steps. This flag FFC is set to 1 according to the running state of the vehicle by another process, not illustrated.

In a step S5, a difference $\Delta Avtp_n = Avtp_n - Avtpoi_n$ between $Avtp_n$ and $Avtpoi_n$ which is a cylinder-specific $Avtp_n$ on the immediately preceding occasion injection, is compared with an asynchronous injection determining level LASNI. When $\Delta Avtp_n \leq LASNI$, it is determined that the vehicle is gradually accelerating or gradually decelerating, and in a step S6, the cylinder-specific increase/decrease correction amount $Chos_n$ [msec] is calculated by the next expressions (3) or (4).

For gradual acceleration:

$$Chos_n = \Delta Avtp_n \cdot (Gztwp + KGZ1) \qquad (3)$$

where,

Gztwp=increase amount gain [absolute number],
KGZ1=gain during fuel recovery.

For gradual deceleration:

$$Chos_n = \Delta Avtp_n \cdot (Gztwm + KGZ1) \qquad (4)$$

where,

Gztwm=decrease amount gain [absolute number].

Herein, $Chos_n$ is a correction amount relating to fast response wall flow. Gztwp of expression (3), Gztwm of expression (4) are gains for performing a water temperature correction described hereafter.

If the aforesaid determining level l is made a small value, good response can be obtained for a minute variation of intake air flow rate and a minute change of fuel wall flow. In other words, many short pulse signals are output, and $Chos_n$ becomes small. However, it should not be so small that $Injset_n$, described hereafter, falls in the precision impairing region of the injector 4.

The gain KGZ1 in this invention during fuel recovery of the step S6 is a new gain introduced in this invention, and will be described in detail hereafter.

In a step S7, it is determined whether or not calculation of the cylinder-specific increase/decrease correction amount $Chos_n$ has been completed for one cycle, i.e. six cylinders. When calculation of $Chos_n$ is finished for all cylinders, the routine proceeds to a step S8, and if it is not finished, the processing of the steps S5–S6 is repeated.

This is because the load fluctuation equivalent amount $\Delta Avtp_n$ is different for each cylinder, so $Chos_n$ must also be calculated for each cylinder. Even during rapid acceleration, $Injset_n$ and $ERACI_n$ described hereafter need to be calculated for each cylinder.

For example, when the ignition sequence is #1-#5-#3-#6-#2-#4, $Chos_n$ is first calculated for cylinder #1, and the calculation of $Chos_n$ is then performed for cylinder #5. Likewise, calculation of $Chos_n$ is then performed in the sequence cylinder #3, cylinder #6, cylinder #2 and cylinder #4. When calculation of $Chos_n$ is finished for all cylinders, the routine proceeds from the step S7 to a step S8. The time necessary to calculate $Chos_n$ for all cylinders is much shorter than 10 milliseconds, which is the calculation interval of the cylinder-specific fuel injection pulse width $Ti_n$. Accordingly, the situation does not occur that the next calculation of $Ti_n$ takes place before the calculation of $Chos_n$ is completed for all cylinders.

The cylinder-specific synchronous injection pulse width $Ti_n$ [msec] is calculated by the following expression (5) in the step S8, and the process is terminated.

$$Ti_n 32 \; \{(Avtp + Kathos) \cdot Tfbya \cdot \alpha + (Chos_n - ERACI_n)\} \cdot 2 + Ts \qquad (5)$$

where,

Kathos=transition correction amount [msec],

Tfbya=target air-fuel ratio equivalent amount [absolute number],

α=air-fuel ratio feedback correction coefficient [absolute number], $ERACI_n$=cylinder-specific oversupply correction amount [msec], Ts=ineffectual pulse width [msec].

Herein, Kathos is a correction amount for slow response wall flow. The target fuel air ratio equivalent amount Tfbya is the sum of a water temperature increase correction coefficient Ktw and a post-startup increase correction coefficient Kas. Immediately after a cold start-up when the engine is particularly unstable, Tfbya is larger than 1.0 and fuel is increased accordingly.

The ineffectual pulse width Ts is a value corresponding to the response delay from when an injection signal is output to the injector 4 to when the injector 4 opens. The cylinder-specific oversupply correction amount $ERACI_n$ is described hereafter.

The number 2 before Ts on the right-hand side of expression (5) is a value expressing the fact that sequential injection is performed, i.e. one injection is performed for two engine rotations in each cylinder.

When $\Delta Avtp_n > LASN1$ in the step S5, in other words during rapid acceleration, the routine proceeds to a step S9. In the step S9, the cylinder-specific asynchronous injection pulse width $Injset_n$ [msec] is calculated by the next expression (6).

$$Injset_n = \Delta Avtp \cdot (Gztw \cdot Gzcyl + KGZ1) + Ts \qquad (6)$$

where,

Gztw=correction gain based on cooling water temperature [absolute number],

Gzcyl=correction gain based on the asynchronous injection timing [absolute number].

Synchronous injection is performed in synchronism with the engine rotation, but asynchronous fuel injection is performed during acceleration independently of the timing with synchronous injection is performed. This is so as to compensate the response delay of intake air amount during rapid acceleration, i.e. compensate the output signal of the air flow meter 7 relative to an opening variation of the throttle 8.

As asynchronous injection is unrelated to synchronous injection timing, the conditions occurring when asynchronous injection is performed are different depending on the cylinder, i.e. some cylinders are aspirating air and some are discharging exhaust at the time of injection. A large wall flow amount may therefore occur depending on the cylinder.

In order to adjust this wall flow for the following synchronous injection, a cylinder-specific oversupply correction $ERACI_n$ is calculated by the following expression (7) in a step S10.

$$ERACI_n = ERACI_n(\text{old}) + \Delta Avtp_n \cdot Gztw \cdot (Gcyl - ERACP) \quad (7)$$

where, $ERACI_n(\text{old})$ = value of $ERACI_n$ on immediately preceding occasion, $ERACP$ = reference value for calculating an oversupply amount on the present occasion.

Figure 10:
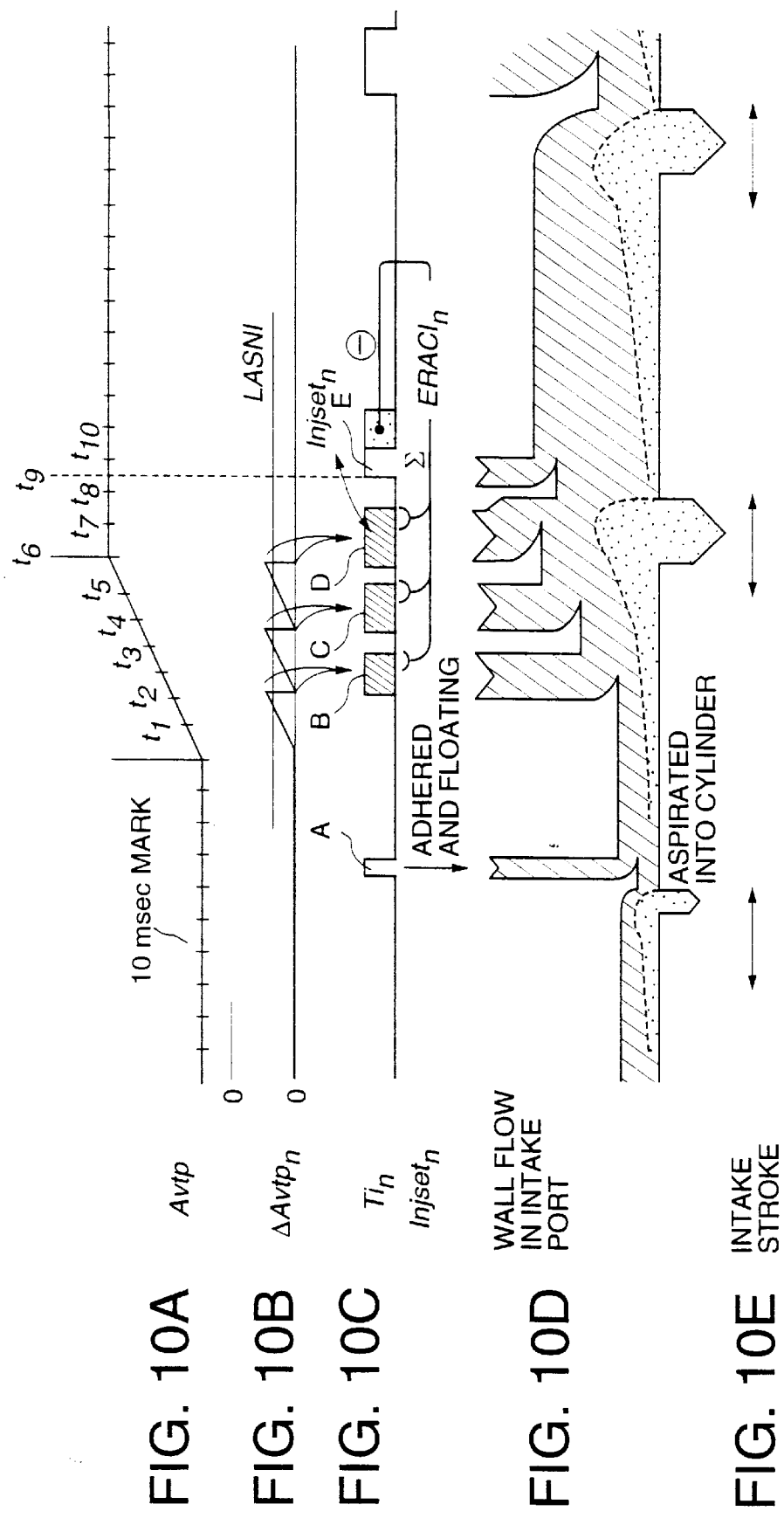
FIGS. 10A–10E are timing charts describing the wall flow correction performed by the air-fuel ratio control device on the high frequency component of wall flow during rapid acceleration.

As asynchronous injection is performed once in every process execution interval, which in this embodiment is 10 milliseconds, provided that the conditions of the step S5 hold, a plurality of asynchronous injections will be successively performed before the next synchronous injection in any given cylinder as shown for example in FIG. 10C. In this case, $ERACI_n(\text{old})$ is applied to the second and subsequent asynchronous injections. The first term on the right-hand side of the equation (7) therefore represents an oversupply amount up to the immediately preceding occasion, and the second term on the right-hand side is an oversupply on the present occasion.

$ERACI_n$ corrects for oversupply due to asynchronous injection and for decrease of wall flow due to flowrate increase through the intake port during aspiration immediately after acceleration. As a result, $ERACI_n$ calculated during asynchronous injection is applied only to the immediately succeeding synchronous injection. Under other conditions, $ERACI_n$ is reset to 0 as described hereafter.

Next, $Gztw$ and $Gcyl$ of expressions (6), (7) will be described.

Figure 3:
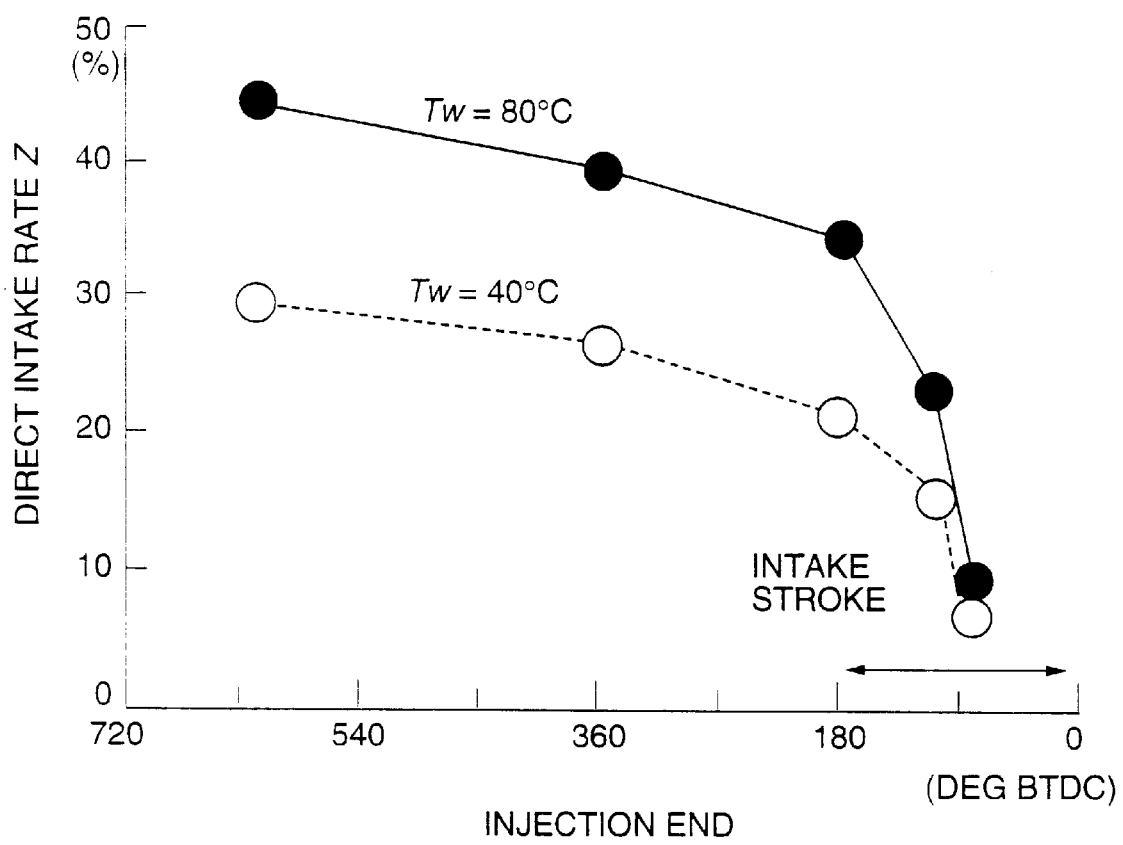
FIG. 3 is a diagram describing a relation between a direct intake proportion Z of injected fuel, a fuel injection timing and a cooling water temperature Tw.

The full amount of fuel injected by the injector 4 is not aspirated into the combustion chamber 1A on the first intake stroke immediately after injection, and a part of the fuel adheres to the wall of the inlet pipe surface. Some of this adhering fuel vaporizes and is aspirated into the combustion chamber 1A in a short time, but the remainder spreads over the wall surface and enters the combustion chamber with a delay. When the fuel injection amount is varied, if the fuel proportion reaching the combustion chamber in the first intake stroke immediately after injection is a direct intake rate Z the direct intake rate Z largely varies with the injection end timing and cooling water temperature Tw, as shown in FIG. 3. When a gain corresponding to the inverse of the direct intake rate Z is separated into a water temperature term and an injection timing term, the following expressions are obtained.

Water temperature term=$Gztw = f(Tw)$

Injection timing term=$Gcyl = f(1/T)$ where,

T = crank angle from injection timing to intake stroke.

$Gztw$ gives the gain at the position where the injection timing is the furthest from the intake stroke, i.e. the furthest to the left on FIG. 3, for various water temperatures, and $Gztw$ is corrected by $Gcyl$. When $Gcyl=1$ for the injection timing farthest from the intake stroke, a larger value is given to $Gcyl$ as the injection timing approaches the intake stroke.

Thus, by providing the gains $Gcyl$ and $Gztw$, $Injset_n$ calculated by the expression (6) becomes larger and the second term of expression (7) becomes larger the nearer the injection timing is from the intake stroke, i.e. the shorter the waiting time until the intake stroke and the lower the cooling water temperature.

During rapid acceleration when the intake negative pressure during the intake stroke is largely fluctuating, a flowrate due to the pressure change in the cylinder, which is near to the pressure change in the intake passage, is added to the flowrate due to the action of the piston in the engine. Therefore the flowrate of the intake port 13 increases when the cylinder internal pressure variation is superposed on the intake stroke as compared to the case when the cylinder internal pressure variation is not superposed on the intake stroke. This causes increased vaporization of the fuel adhering to the inlet pipe wall surface, and the direct intake rate Z becomes large. An excessive amount of fuel corresponding to the increase in air volume during the intake stroke also becomes necessary. $Gcyl$ is set so as to allow for these elements.

In the expression (7), in the first synchronous injection amount immediately following an asynchronous injection, the fuel amount required to avoid the air-fuel ratio becoming lean is given by $\Delta Avtp_n \cdot Gztw \cdot ERACP$.

In the intake stroke, the value of $Gcyl$ used in the expressions (6), (7) comprises both the air volume variation and the wall flow increase. Accordingly, a reference value of $ERACP\#$ corresponding to both the air volume change and wall flow increase is used as the value of $ERACP$ for the expression (7) in the intake stroke. On the other hand, the value of $Gcyl$ used in the expressions (6), (7) at times other than during the intake stroke corresponds only to the wall flow increase. Accordingly, a reference value $ERACPH\#$ corresponding only to the wall flow increase is used as the value of $ERACP$ except during the intake stroke. Thus way the value of $ERACP$ is different in a cylinder where asynchronous injection is performed during the intake stroke and a cylinder where it is not performed during the intake stroke.

Now the process returns to a step S11 of FIG. 2A, and the cylinder-specific asynchronous injection pulse width $Injset_n$ calculated in the step S9 is immediately output to the I/O port 24 and asynchronous injection Is performed.

In a step S12, it is determined from the flag FRC whether fuel recovery is being performed. When FRC=1, i.e. when fuel recovery is being performed, the routine proceeds to a step S13, and proceeds to a step S14 after entering 1 in a counter $CNT_n$ of the cylinder which performed asynchronous injection. When FRC=0, i.e. when fuel recovery is not being performed, the routine proceeds directly to a step S14. The counter $CNT_n$ is necessary for determining the end of fuel recovery conditions.

In a step S14, after transferring the value of $Avtpoi_n$ for the cylinder which performed asynchronous injection to a memory $Avtpoi_n(\text{old})$ of the same cylinder, the value of $Avtp_n$ at that time is stored in $Avtpoi_n$. In other words, an engine load equivalent amount during asynchronous injection is stored in $Avtpoi_n$ for every cylinder. Also, as $Chos_n$ is unnecessary for asynchronous injection, $Chos_n$ is reset to 0 in the step S14.

In the step S7, it is determined whether or not the calculation of $Injset_n$ and $ERACI_n$, and the processing of the asynchronous injection using $Injset_n$, have been completed for all six cylinders. When this processing is complete for all six cylinders, the routine proceeds to the step S8. The processing of the steps S9–S14 is performed in this way for all cylinders during rapid acceleration.

Assume that the ignition sequence is #1-#5-#3-#6-#2-#4 as described hereabove, and that the calculation of $Injset_n$ and $ERACI_n$ and asynchronous injection have been performed for cylinder #1. The calculation of $Injset_n$ and $ERACI_n$ and asynchronous injection are performed next for cylinder #5. Subsequently, the calculation of $Injset_n$ and $ERACi_n$ and asynchronous injection are performed in the sequence #3, #6, #2, #4.

This completes the calculation of $Injset_n$ and $ERACI_n$ and asynchronous injection for all the cylinders, and the routine proceeds from the step S7 to the step S8. The time required for the calculation of $Injset_n$ and $ERACI_n$ for all cylinders and for performing synchronous injection in all cylinders is much shorter than 10 milliseconds, which is the calculation interval of $Ti_n$. Accordingly, calculation of the next $Ti_n$ does not occur before calculation has been completed for all cylinders.

Figure 4:
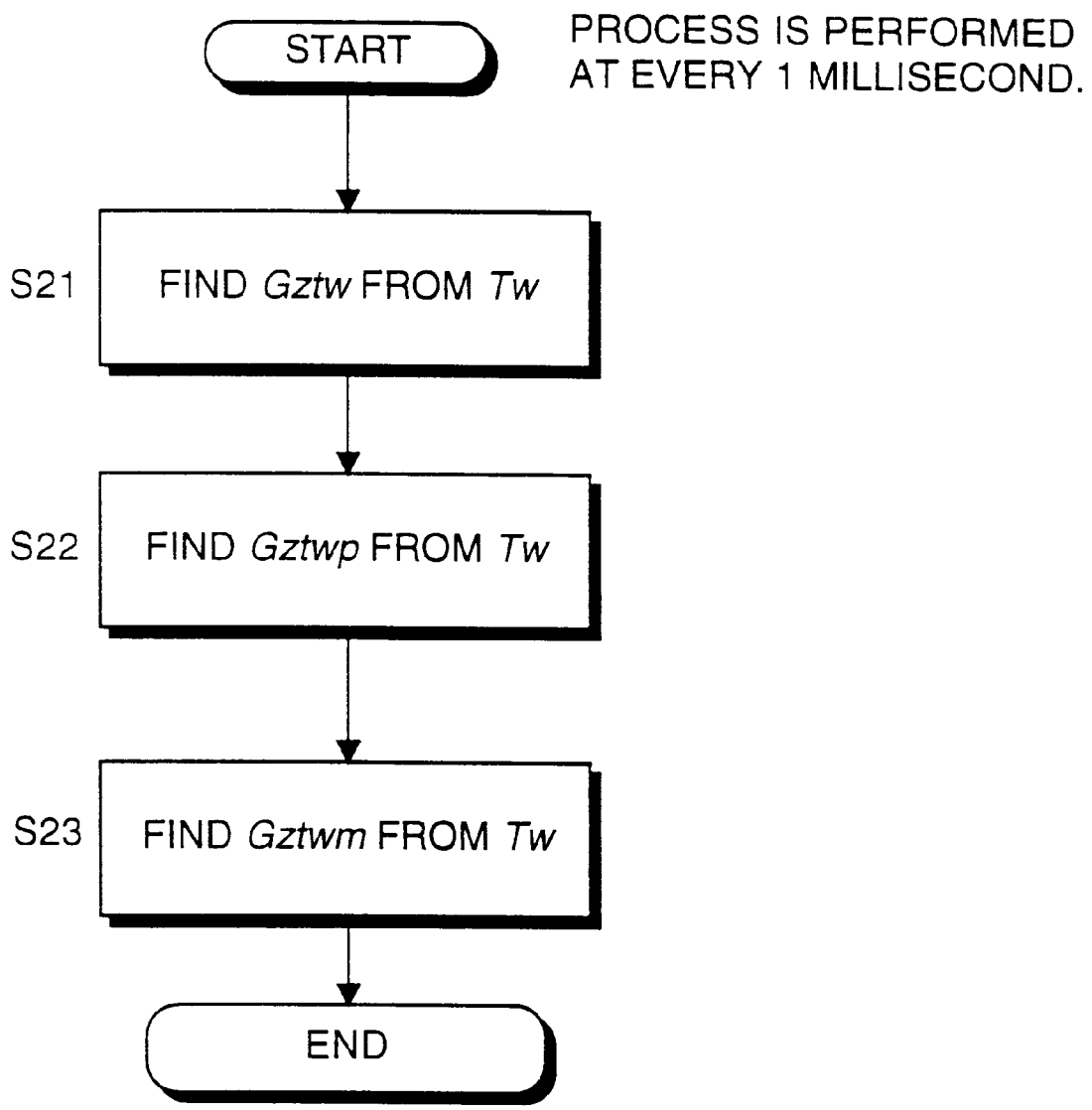
FIG. 4 is a flowchart describing a process for calculating gains Gztw, Gztwp, Gztwm performed by the air-fuel ratio controller.

The flowchart of FIG. 4 shows the process used to calculate the asynchronous injection gain Gztw, the increase amount gain Gztwp and the decrease amount gain Gztwm. This process is performed every second.

Figure 5:
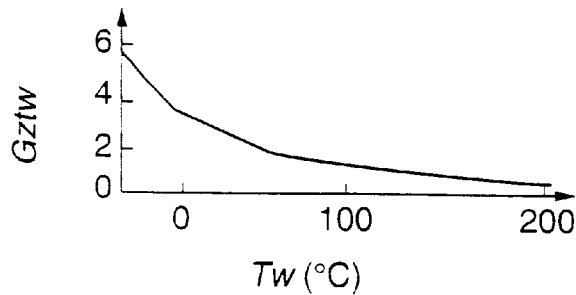
FIG. 5 is a graph showing the contents of a table of the cylinder-specific asynchronous injection gain Gztw stored in the air-fuel ratio controller.
Figure 6:
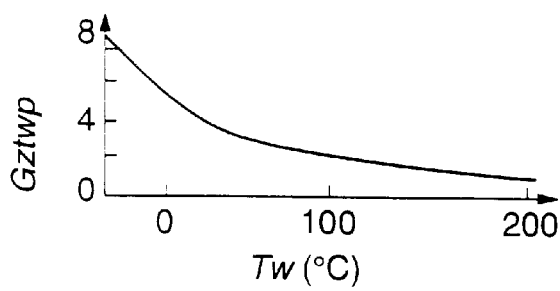
FIG. 6 is a graph showing the contents of a table of a cylinder-specific increase gain Gztwp stored in the air-fuel ratio control device.
Figure 7:
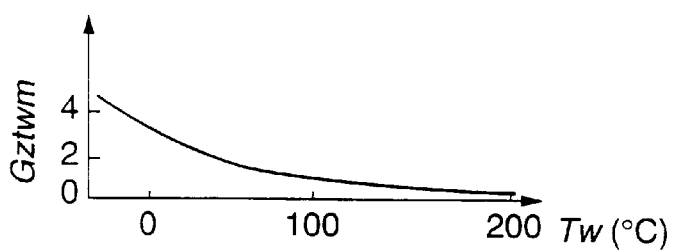
FIG. 7 is a graph showing the contents of a table of a cylinder-specific decrease gain Gztwm stored in the air-fuel ratio control device.

In steps S21, S22, S23, the aforesaid asynchronous injection gain Gztw [absolute number], increase amount gain Gztwp [absolute number] and decrease amount gain Gztwm [absolute number] are respectively found from the cooling water temperature Tw by looking up tables shown in FIGS. 5, 6 and 7. The wall flow amount is greater the lower the cooling water temperature low, so $Chos_n$, $Injset_n$, $ERACI_n$ are increased the lower the cooling water temperature falls. $Chos_n$ is then calculated by using the two gains Gztwp and Gztwm calculated in this way in the step S6 of FIG. 2A. Also, the cylinder-specific injection pulse width $Injset_n$ and the cylinder-specific oversupply correction $ERACI_n$ are found by using asynchronous injection gain Gztw in the steps S9, S10 of FIG. 2A.

Figure 8:
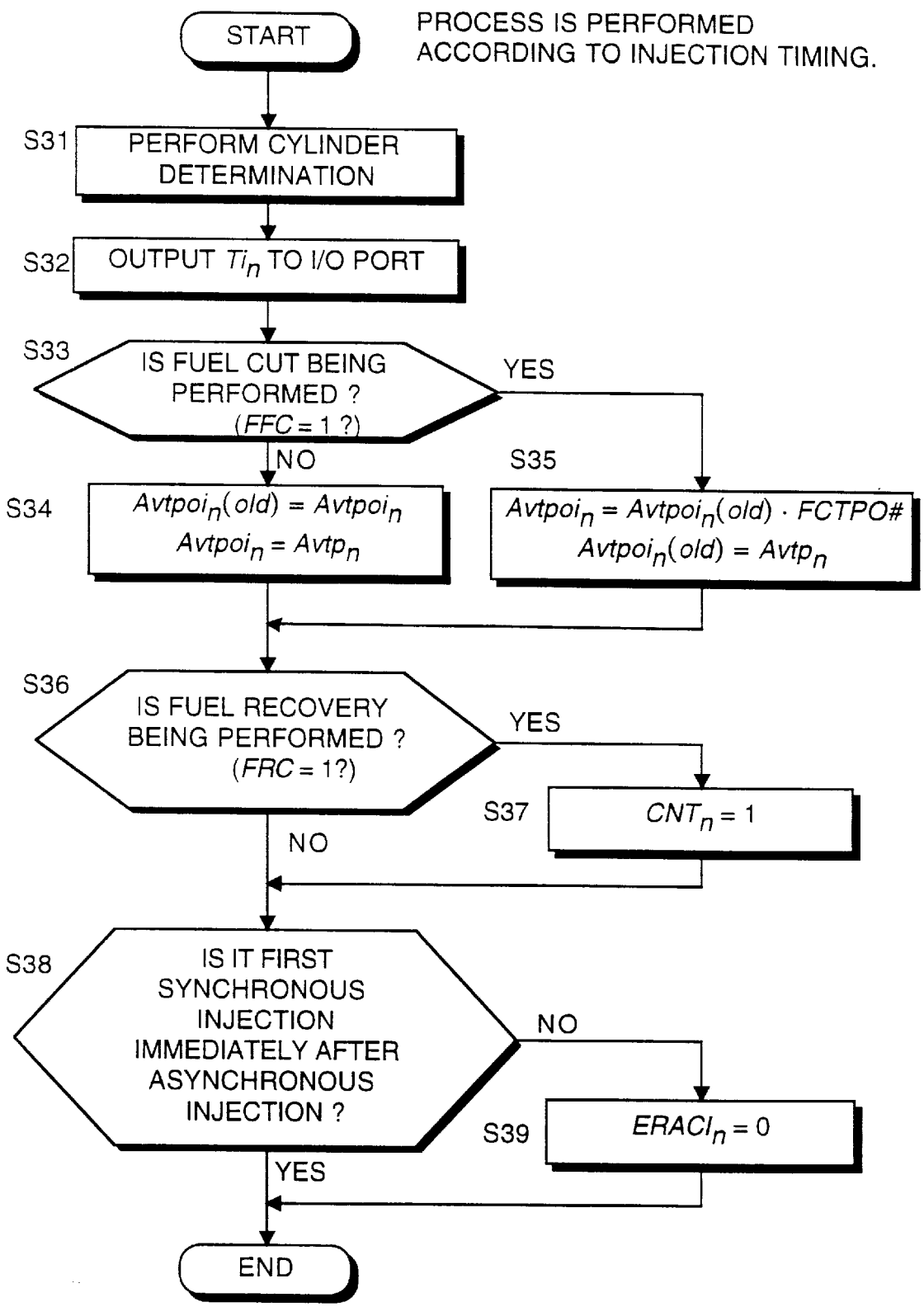
FIG. 8 is a flowchart describing a fuel injection control process performed by the air-fuel ratio controller.
Figure 9:
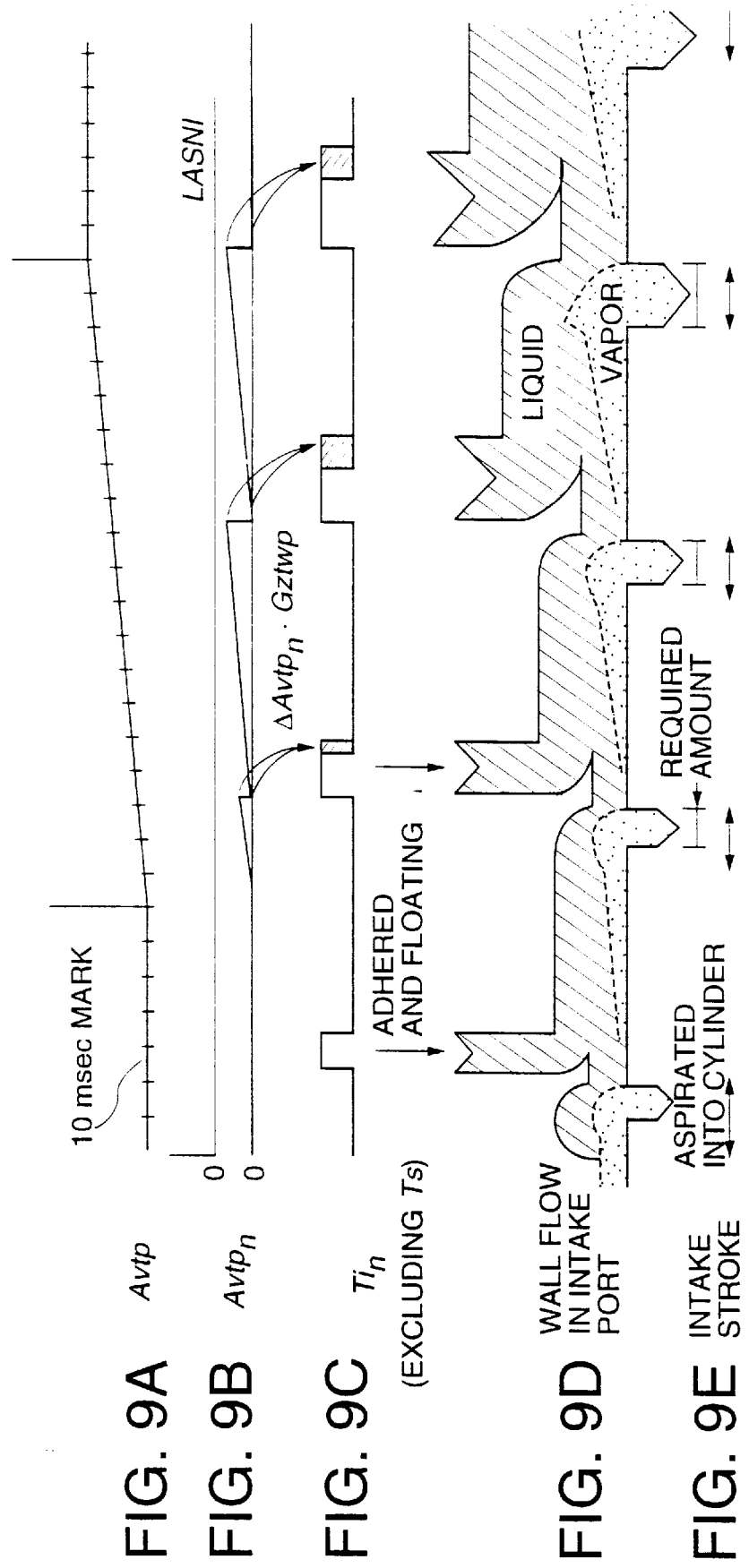
FIGS. 9A–9E are timing charts describing the wall flow correction performed by the air-fuel ratio controller on a high frequency component of wall flow during gradual acceleration.

The flowchart of FIG. 8 shows the fuel injection control process performed by the control unit 20 according to the injection timing. For sequential injection wherein fuel is injected in sequence for each cylinder, fuel is injected every time a Ref signal corresponding to each cylinder is input. In a four-stroke, six cylinder engine, six Ref signals are output every two rotations of the engine. In other words, one injection and a corresponding process is performed each time the crank angle rotates through 120 degrees.

First, in a step S31, a cylinder determination is performed, i.e. it is determined for which cylinder the fuel injection control process is being performed.

In a step S32, a synchronous injection is performed in the corresponding cylinder by outputting $Ti_n$, which was already obtained in the step S8 of FIG. 2A, to the I/O port 24.

In a step S33, it is determined from the flag FFC whether or not fuel cut is being performed. When FFC≠1, i.e. when fuel cut is not being performed, the routine proceeds to a step S34.

In the step S34, a value of $Avtpoi_n$ of the cylinder in which synchronous injection was performed is stored as $Avtpoi_n$ (old), and an engine load equivalent amount $Avtp_n$ for that cylinder is stored as $Avtpoi_n$ for the same cylinder. In other words, an engine load equivalent amount for synchronous injection is stored in $Avtpoi_n$ for every cylinder. On the other hand, the engine load equivalent amount $Avtp_n$ for asynchronous injection is also stored in $Avtpoi_n$ as was described in the step S14 of FIG. 2A. As a result, $Avtpoi_n$ represents the load equivalent amount in the most recent injection regardless of whether it was synchronous or asynchronous. After the processing of the step S34, the routine proceeds to a step S36.

Conversely, when FFC=1 in the step S33, i.e. when it is determined that fuel cut is being performed, the routine proceeds to a step S35. In the step S35, $Avtpoi_n$ is updated by the following equation (8).

$$Avtpoi_n = Avtpoi_n(\text{old}) \cdot FCTPO\# \tag{8}$$

where,

FCTPO#=decrease proportion [absolute number].

After updating with this equation, this value of $Avtpoi_n$ is transferred to the memory $Avtpoi_n$(old) of the cylinder in which synchronous injection is performed for the purpose of performing the next control.

Figure 13A:
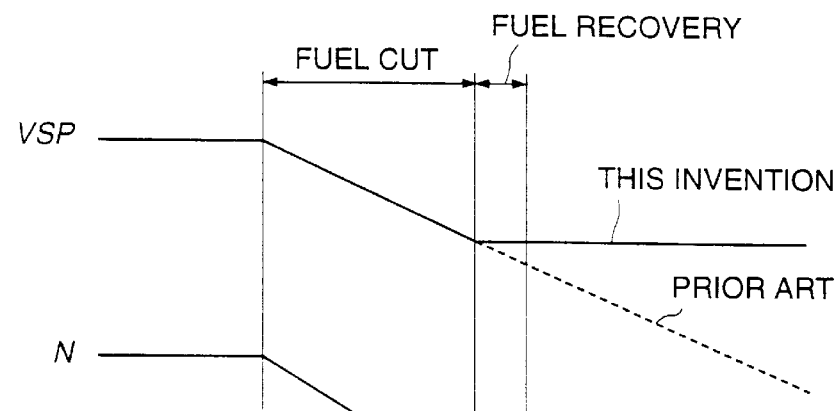
FIGS. 13A–13D are timing charts describing the wall flow correction performed by the air-fuel ratio controller on the high frequency component of wall flow during fuel recovery.
Figure 13B:
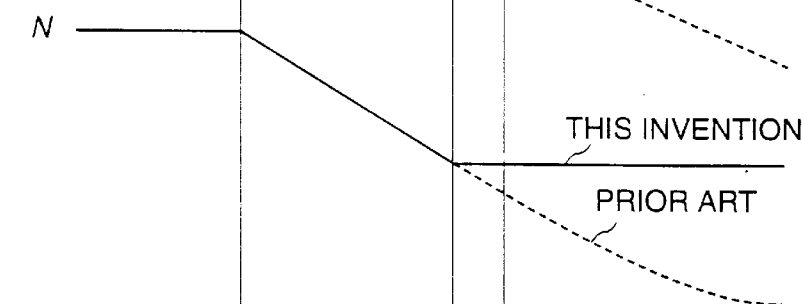
Figure 13C:
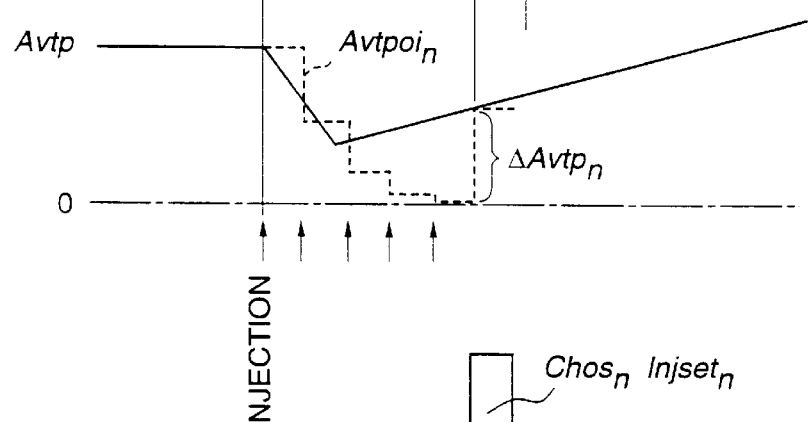
Figure 13D:
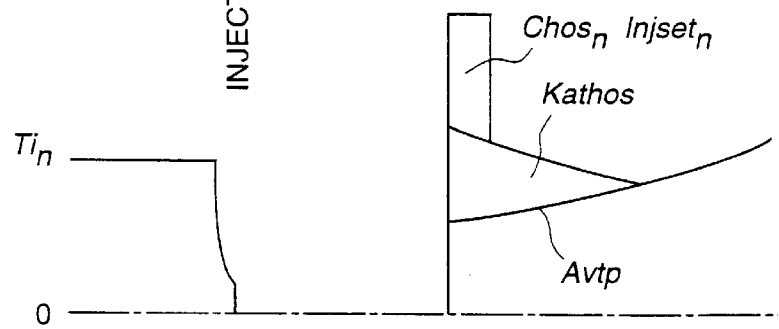

When fuel cut is performed, the wall flow disappears in every cycle, therefore $Avtpoi_n$ is decreased as shown in FIG. 13C by setting the decrease proportion FCTPO# to match this decrease of wall flow.

The steps S36, S37 are identical to the steps S12, S13 of FIG. 2A. When the flag FRC=1, i.e. during fuel recovery, the routine proceeds to a step S37, 1 is entered in the counter $CNT_n$ for the cylinder in which synchronous injection was performed, and the routine proceeds to a step S38. When the flag FRC≠0, i.e. when fuel recovery is not being performed, the routine proceeds directly to the step S38.

In the step S38, it is determined whether or not the injection is the first synchronous injection immediately after the asynchronous injection. When the injection is not the first injection immediately after the asynchronous injection, the routine proceeds to a step S39 and $ERACI_n$ is reset to 0. In other words, $ERACi_n$ is taken into account and the oversupply amount due to asynchronous injection is decreased only for the first synchronous injection immediately following an asynchronous injection in every cylinder.

Herein, referring to FIGS. 9A–9E and FIGS. 10A–10E, a description will be given of how the high frequency component of the wall flow varies for one cylinder (a specific cylinder) in the group of six cylinders.

In FIGS. 9A–9E, synchronous injection alone is performed due to gradual acceleration, and in FIGS. 10A–10E, three asynchronous injections are performed for a specific cylinder due to rapid acceleration. A mark is stamped every 10 milliseconds on the variation of Avtp shown in FIG. 9A and FIG. 10A. Therefore, $t_1$–$t_{10}$ shown in FIG. 10A correspond to the 10-millisecond mark with the exception of $t_9$.

Next, referring to FIGS. 10A–10E, a detailed description will be given of how the oversupply correction amount $ERACI_n$ varies. The synchronous injection immediately preceding an asynchronous injection will be referred to as a, asynchronous injections as B, C, D, and the first synchronous injection immediately following the asynchronous injections as E.

If Kathos is omitted from the aforesaid equation (5) and Tfbya, $\alpha$ are both set to 1.0, this equation may be simplified as follows.

$$Ti_n = Te_n \cdot 2 + Ts$$

where, $Te_n = Avtp + Chos_n - ERACI_n$ = cylinder-specific effectual pulse width.

At time $t_1$, $Chos_n(>0)$ and $Te_n$ are calculated. At this time, $ERACI_n$ is 0.

At time $t_2$, $Injset_n$ is calculated, and asynchronous injection B is immediately performed. At this time, as $ERACI_n$(old)=0, $ERACI_n$ is given by the following equation.

$$ERACI_n = \Delta Avtp_n \cdot Gztw \cdot (Gzcyl - ERACP)$$

Assume that $ERACI_n$ at that time is $E1(>0)$.

At time $t_3$, $Chos_n(>0)$ and $Te_n$ are calculated. At this time, $ERACI_n$ is still $E1$.

At time $t_4$, $Injset_n$ is calculated, and the asynchronous injection C is immediately performed. This is the second asynchronous injection. At this time, $ERACI_n$ is expressed by the following equation.

$$ERACI_n = E1 + DAvtp_n \cdot Gztw \cdot (Gzcyl - ERACP)$$

If the second term on the right-hand side of the above equation is $E2$ $(>0)$, $ERACI_n = E1 + E2$.

At time $t_5$, $Chos_n(>0)$ and $Te_n$ are calculated.

At this time, $ERACI_n = E1 + E2$, which is the same as at $t_4$.

At time $t_6$, $Injset_n$ is calculated, and the asynchronous injection D is immediately performed. This is the third asynchronous injection. At this time, $ERACI_n$ is expressed by the following equation.

$$ERACI_n = E1 + \Delta Avtp_n \cdot Gztw \cdot (Gzcyl - ERACP)$$

The third term on the right-hand side of the above equation is $E3$ $(>0)$, $ERACI_n = E1 + E2 + E3$.

At time $t_7$, $Chos_n(=0)$ and $Te_n$ are calculated. Regarding $ERACI_n$, $ERACI_n = E1 + E2 + E3$, which is the same as $t_6$.

At time $t_8$, the effectual pulse width $Te_n$ is calculated by the following equation.

$$Te_n = Avtp - ERACI_n = Avtp - (E1 + E2 + E3)$$

At a time $t_9$, the synchronous injection E is performed with the synchronous injection timing using $Te_n$ calculated by the above equation at time $t_8$. In the above equation, $E1$ is an oversupply amount in the first asynchronous injection, $E2$ is an oversupply amount in the second asynchronous injection and $E3$ is an oversupply amount in the third asynchronous injection. In the synchronous injection immediately following the end of an asynchronous injection, these oversupply amounts, $E1 + E2 + E3$, are subtracted from the synchronous injection amount $Avtp$. After the synchronous injection amount has been decreased in this way, $ERACI_n$ is reset to 0 so as to prepare for the next asynchronous injection.

At time $t_{10}$, $Chos_n (=0)$ and $Te_n$ are calculated. $ERACI_n$ is 0.

In this manner, the air-fuel ratio can be controlled to the stoichiometric air-fuel ratio for each cylinder at the time of rapid acceleration.

Figure 11:
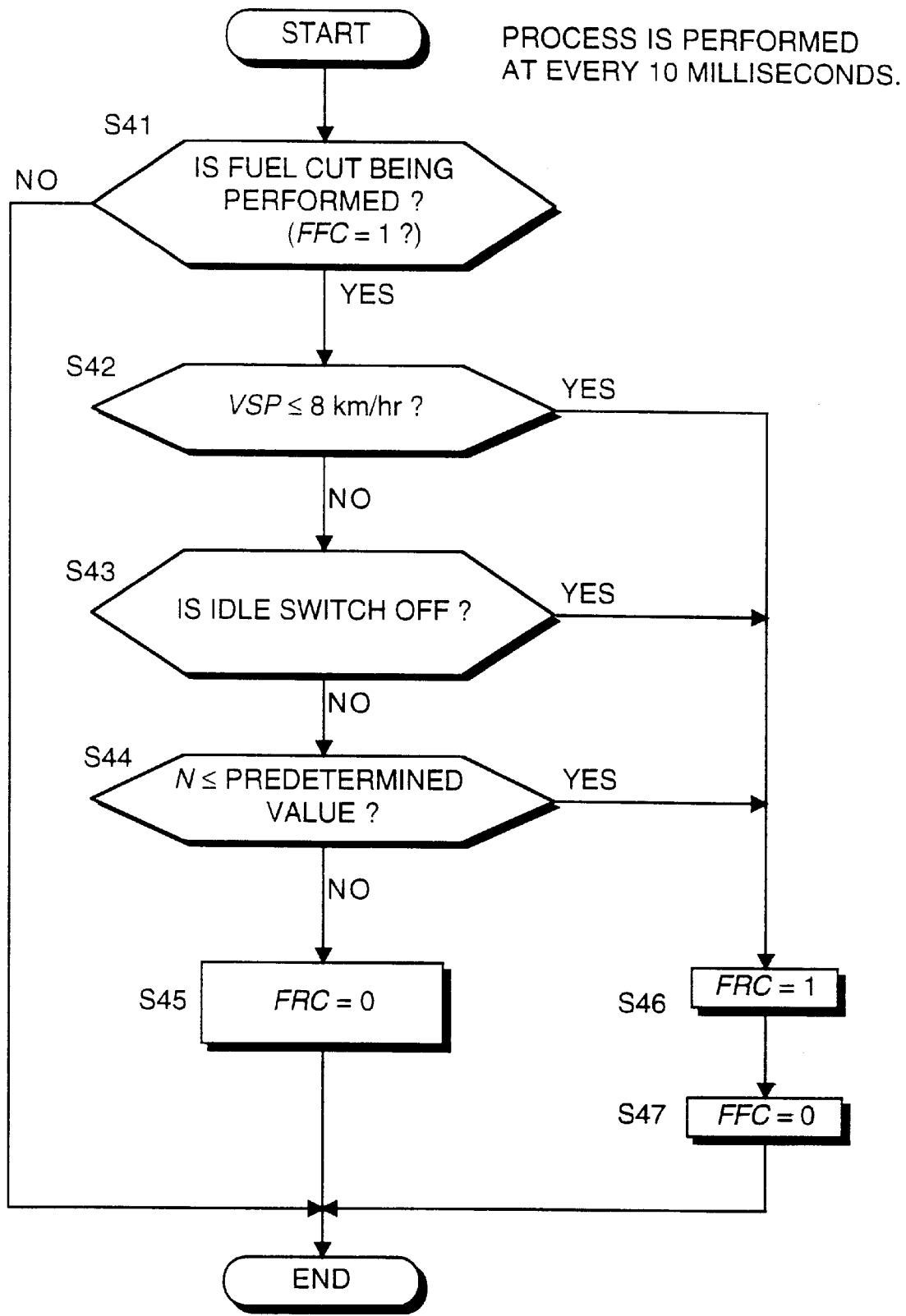
FIG. 11 is a flowchart describing a fuel recovery condition determining process performed by the air-fuel ratio controller.

The flowchart of FIG. 11 shows a fuel recovery condition determining process. The flowchart of FIG. 12 shows a fuel recovery condition end determining process which is performed after the preceding process. These processes are performed independently of the processes of FIGS. 2A, 2B and FIG. 4, for example at an interval of 10 milliseconds.

First, in a step S41, it is determined whether or not the flag FFC=1, i.e. whether or not fuel cut is being performed. The routine proceeds to a step S42 only when fuel cut is being performed. When fuel cut is not being performed, the routine terminates.

In the step S42 and steps S43, S44, the following conditions are examined.

(1) The vehicle speed VSP is equal to or less than a predetermined value (e.g. 8 km/hr).

(2) The idle switch is OFF.

(3) The engine rotation speed N is equal to or less than a predetermined value (e.g. a value depending on the cooling water temperature or 2000 rpm).

When none of the aforesaid conditions is satisfied, it is determined that fuel recovery conditions do not hold, and the flag FRC is reset to 0 in a step S45.

When any of the aforesaid conditions is satisfied, it is determined that fuel recovery conditions hold. In this case, the flag FRC is reset to 1 in a step S46, and the flag FFC is reset to 0 in a step S47.

In a step S51 of FIG. 12, it is determined whether or not FRC=1, i.e. whether fuel recovery is being performed, and when FRC=1, the routine proceeds to a step S52.

In the step S52, it is determined whether or not a counter $CNT_n$ is 1 for all cylinders. When the counter $CNT_n$ is 1 for all cylinders, the flag FRC is reset to 0 in a step S53. Also in a step S54, the counter $CNT_n$ is reset to 0 for all cylinders to prepare for the next fuel recovery control process. In other words, after synchronous injection or asynchronous injection has been performed once in all cylinders from the start of fuel recovery, fuel recovery is terminated.

A simple description will now be given of how injection is performed for a specific cylinder when fuel recovery is being performed. When the fuel recovery start timing $\Delta Avtp_n$ exceeds LASNI, $Injset_n$ and $ERACI_n$ are calculated using this value of $\Delta Avtp_n$, and asynchronous injection is performed after fuel recovery begins as shown in FIGS. 13A–13D. Also, the amount $ERACI_n$ is subtracted from the synchronous injection amount only for the first synchronous injection immediately after asynchronous injection has finished.

Asynchronous injection during fuel recovery starts from a cylinder which has encountered a synchronous injection timing during the fuel cut, and which is in the intake stroke when a fuel recovery signal is issued.

On the other hand, when $\Delta Avtp_n$ at the start of fuel recovery is equal to or less than LASNI, $Chos_n$ is calculated using this value of $\Delta Avtp_n$, and a synchronous injection amount increased by $Chos_n$ is supplied to each cylinder at the first synchronous injection timing after fuel recovery.

In a vehicle provided with an automatic transmission, fuel recovery is performed after fuel cut when the following conditions hold.

A: When the vehicle speed has decreased to a predetermined value or less without depressing the accelerator pedal.

B: When the accelerator pedal is depressed for re-acceleration.

When the wall flow correction is performed, the decrease of wall flow during fuel cut is predicted, and by adding an amount corresponding to this decrease to the injection amount when fuel recovery is performed, the air-fuel ratio at the start of fuel recovery may be made to approach the stoichiometric air-fuel ratio. Therefore, as shown in FIG. 16C, the engine output torque increases sharply during fuel recovery as shown for example in FIG. 16C.

In this case, the required torque is different under the aforesaid two conditions A and B. For this reason, according to the aforesaid prior art controller, wall flow correction is performed as shown by the solid line of FIG. 16A during fuel recovery under condition B, but wall flow correction is not performed as shown by the broken line of FIG. 16A during fuel recovery under condition A.

As a result, due to wall flow correction under condition B, the torque produced by the engine increases sharply as required by the acceleration as shown by the solid line of FIG. 16C, while under condition A, torque shock is prevented due to the fact that the engine torque increases gradually as shown by the broken line in the figure.

The solid line of FIG. 16A is a simplified representation of the fuel injection pulse width $Ti_n$ when wall flow correction is performed, the real waveform having a waveform as shown in FIG. 13D.

However, even when the vehicle speed decreases without depressing the accelerator pedal under condition A, the decrease of the vehicle speed VSP or the engine rotation speed N is not uniform. For example, if the torque is increased gradually during fuel recovery after rapid deceleration, recovery from the sharp drop of engine speed due to the rapid deceleration is delayed.

In this controller, wall flow correction is applied even during fuel recovery under condition A, i.e. when fuel recovery is performed when the idle switch 14 is ON. Moreover, the engine torque which is generated during fuel recovery is controlled according to the decrease amount of engine rotation speed in a predetermined unit time when fuel recovery starts. This rapidly stops the engine rotation speed or vehicle speed falling as shown by the solid lines of FIGS. 13A and 13B.

This is achieved by applying the gain KGZ1 during fuel recovery shown in the steps S6, S9 of FIG. 2, to the equations (3), (4), (6).

However KGZ1 is not introduced into the equation for the cylinder-specific oversupply correction amount $ERACI_n$, $ERACI_n$ being calculated in the same way as for the prior art controller.

Next, the process used to calculate the gain KGZ1 during fuel recovery will be described referring to the flowchart of FIG. 14. This process is performed at a fixed time before the process of FIGS. 2A, 2B.

In a step S61, it is determined whether or not FRC=1, i.e. whether fuel recovery is being performed. In a step S62, it is determined whether or not the idle switch 14 is OFF.

When fuel recovery is being performed, and the idle switch 14 is ON, the routine proceeds to a step S63.

In the step S63, it is determined whether or not fuel recovery was being performed also on the immediately preceding occasion.

When fuel recovery was not being performed on the immediately preceding occasion, i.e. when there is a change-over from fuel cut to fuel recovery, the routine proceeds to a step S64.

In the step S64, an engine rotation speed decrease amount $\Delta N$[rpm/msec] in a predetermined unit time when fuel recovery begins is calculated by the following equation (9).

$$\Delta N = N(\text{old}) - N \quad (9)$$

where,

N(old)=N on immediately preceding occasion.

Figure 15:
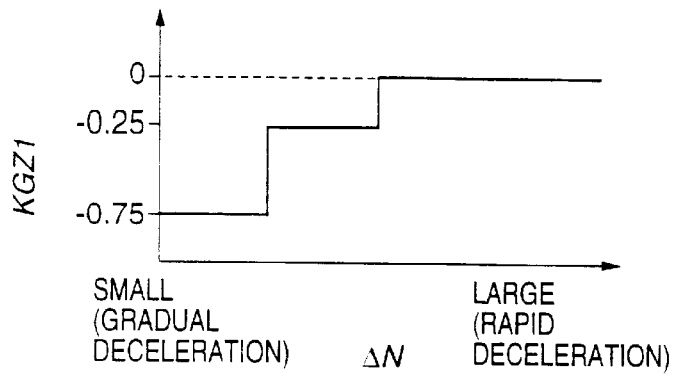
FIG. 15 is a graph showing the contents of a table of the gain KGZ1 stored by the air-fuel ratio controller.

In a step S65, a gain KGZ1 [absolute number] during fuel recovery is calculated from $\Delta N$ by looking up a table shown in FIG. 15. As shown in FIG. 15, KGZ1 has a negative value when $\Delta N$ is small, i.e. during gradual deceleration, and it is 0 when $\Delta N$ is large, i.e. during rapid deceleration.

In a step S66, the value of N is transferred in the memory N(old) for performing the process on the next occasion, and the routine is terminated.

On the other hand when fuel recovery is not being performed or when the idle switch is OFF even when it is being performed, KGZ1 is unnecessary. The routine proceeds from the step S61 or step S62 to a step S67, 0 is entered in KGZ1, the operation of the step S66 is performed, and the routine is terminated.

When the idle switch is ON and file recovery is continuing, the operation of the step S66 is performed immediately following the step S63, and the routine is terminated.

The value of KGZ1 calculated in this way is used in the equations (3), (4), (6). As a result, when the rotation speed decrease amount $\Delta N$ per predetermined unit time is small when fuel recovery is starting, i.e. during gradual deceleration, $Chos_n$ and $Injset_n$ are reduced. Conversely, when the rotation speed decrease amount $\Delta N$ per predetermined unit time is large when fuel recovery is starting, i.e. during rapid deceleration, $Chos_n$ and $Injset_n$ take the same values as in the case of re-acceleration.

It should be noted that in the equation (3), the lower limit of Gztwp+KGZ1 is limited to 0. The reason for this limitation is as follows. The sign of $Chos_n$ depends on the sign of $\Delta Avtp_n$, i.e. when it is positive, it represents an increase, and when it is negative, it represents a decrease. On the other hand, Gztwp Is a value used only for determining gain, hence Gztwp>0. In this air-fuel ratio controller, KGZ1 is 0 or a negative value as shown in FIG. 15, so Gztwm+KGZ1 may have a negative value. However if the gain has a negative value, it is impossible to determine whether $Chos_n$ should be added as an increase or added as a decrease depending on the sign of $\Delta Avtp_n$. Therefore, Gztwp+KGZ1 is limited to 0 or a positive value. For the same reason, the lower limit of Gztwm+KGZ1 is limited to 0 in the equation (4), and the lower limit of Gztw. Gzcyl+KGZ1 is limited to 0 in the equation (6).

In the air-fuel ratio controller according to this invention, wall flow correction is performed even during fuel recovery when the idle switch is ON, and a gain KGZ1 is introduced according to the rotation speed decrease $\Delta AN$ per predetermined unit time when fuel recovery begins.

Also, when the idle switch is ON and fuel recovery is performed during rapid deceleration, i.e. when $\Delta N$ is large, KGZ1 is set to 0. The torque during fuel recovery after rapid deceleration therefore sharply increases together with the fuel recovery, and excessive decrease of engine rotation speed due to the sharp deceleration is prevented.

On the other hand, when the idle switch is ON and fuel recovery is performed during gradual deceleration, i.e. when $\Delta N$ is small, a negative value is assigned to KGZ1. As a result, the cylinder-specific increase/decrease correction amount $Chos_n$ calculated by the aforesaid equation (4) and the cylinder-specific asynchronous injection pulse width $Injset_n$ calculated by the aforesaid equation (6) are respectively reduced. In this way, when fuel recovery is performed during gradual deceleration, the torque increase due to the fuel recovery is smoothed out by making $Chos_n$ and $Injset_n$ smaller than in the case when fuel recovery is performed after sharp deceleration, as shown by the broken line in FIG. 16E.

The reason why the torque increases in a stepwise fashion as shown by this broken line, is that torque is generated each time there is combustion in each cylinder. In FIG. 16E, there is a coincidence with the solid line after combustion takes place in three cylinders. The number of cylinders in which combustion takes place until the output torque coincides with the case KGZ1=0 is determined by the gain KGZ1 independently of the number of cylinders with which the engine is equipped.

Next, a second embodiment of this invention will be described referring to FIGS. 17–21.

Figure 14:
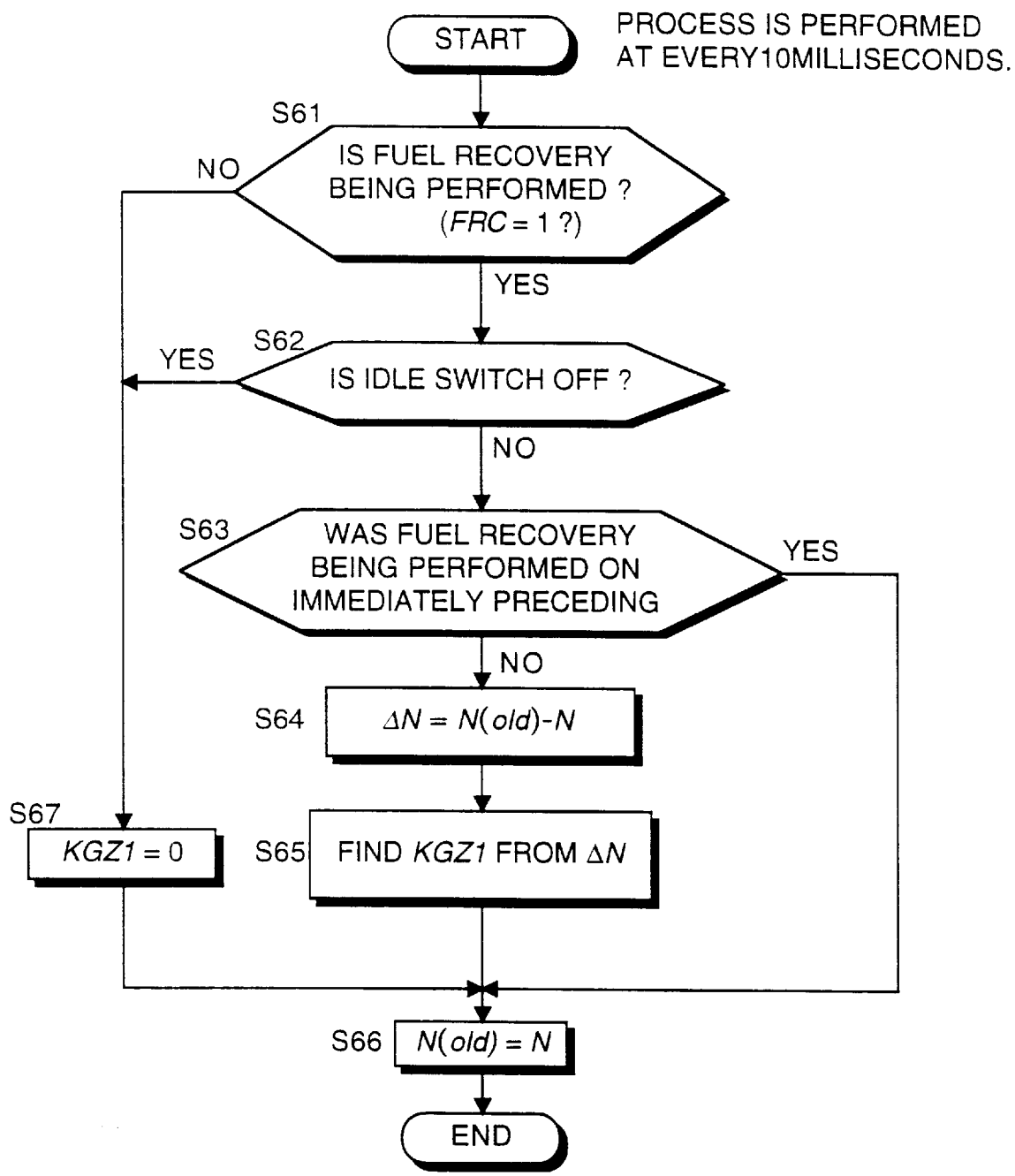
FIG. 14 is a flowchart showing a process for calculating a gain KGZ1 performed by the air-fuel ratio controller.
Figure 17:
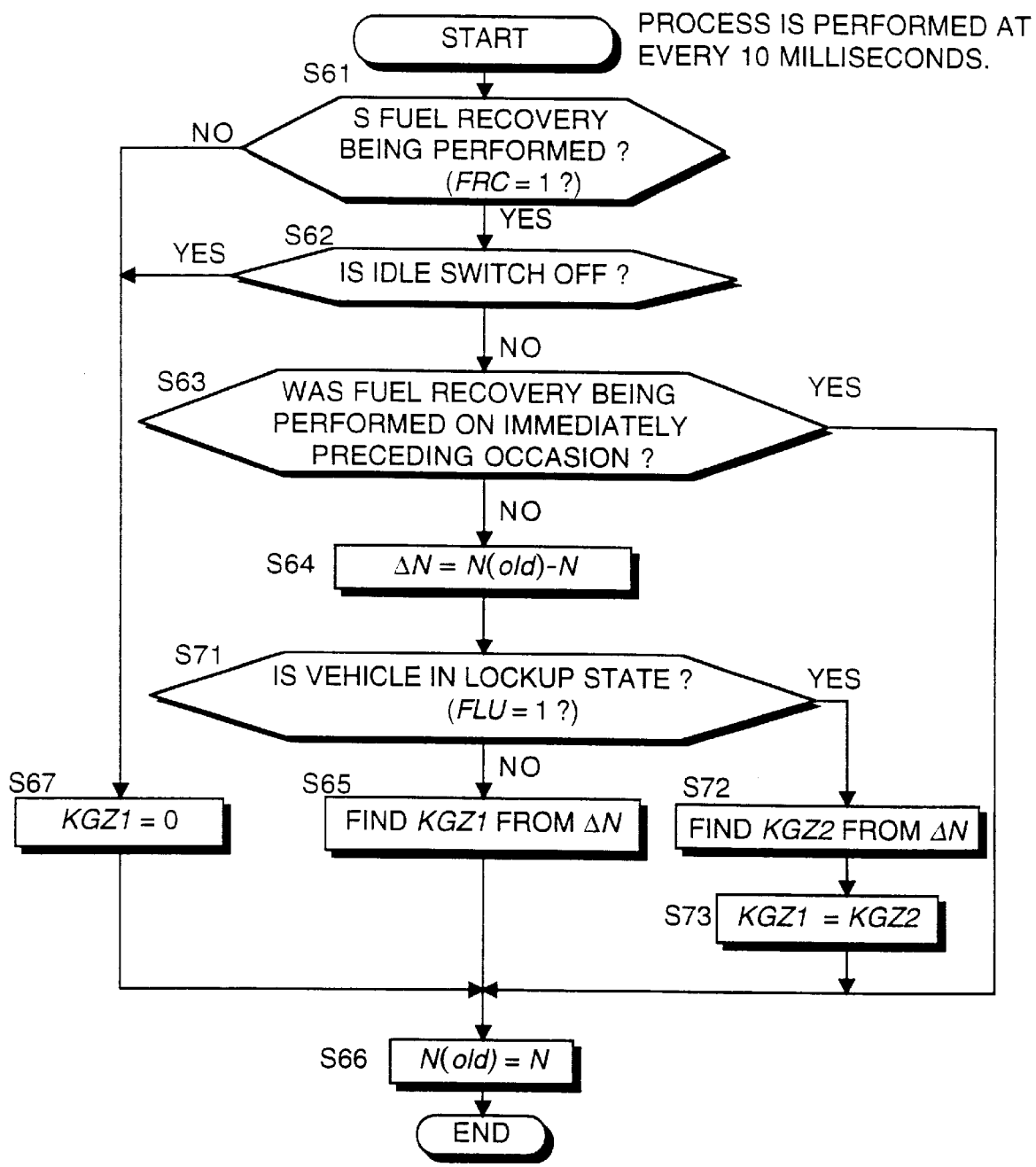
FIG. 17 is similar to FIG. 14, but showing a second embodiment of this invention.

The flowchart of FIG. 17 corresponds to FIG. 14 of the aforesaid first embodiment. The same step numbers are assigned to parts identical to those of FIG. 14.

According to this embodiment, the vehicle comprises an automatic transmission, which has a "lockup mechanism", i.e., a mechanism for directly transferring the engine output torque to the transmission when required.

If fuel recovery is performed in the lockup state when the engine and automatic transmission are coupled together, and the idle switch is ON, increase of engine rotation speed is delayed by an amount corresponding to the load on the engine due to the automatic transmission. Therefore if fuel recovery is performed when the idle switch is ON, a lockup release signal must be output to release the lockup state. However fuel recovery may take place while the engine and automatic transmission are still coupled together during the response time interval from when the lockup release signal is given to when the lockup mechanism is actually released. In such a case, even when the usual fuel recovery is performed, it may occur that the drop of engine rotation speed and vehicle speed cannot be immediately resolved as shown by the broken lines of FIGS. 19C, 19D, and the engine running state may become unstable.

Therefore, according to this embodiment, if fuel recovery is performed from sharp deceleration when the idle switch is ON and the vehicle is in the lockup state, the cylinder-specific increase/decrease correction $Chos_n$ and the cylinder-specific asynchronous injection pulse width $Injset_n$ are corrected so as to increase the engine torque compared to the case when the engine is not in the lockup state.

Figure 18:
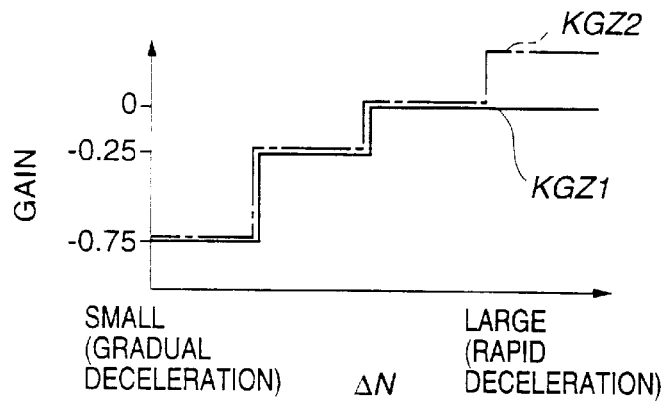
FIG. 18 is diagram showing characteristics of the gain KGZ1 and a gain KGZ2 used by an air-fuel ratio controller according to the second embodiment.

Steps S71–S73 in FIG. 17 are new steps added for this purpose. In the step S71, it is determined whether or not the vehicle is in a lockup condition from the flag FLU. When the flag FLU=1, it is determined that the vehicle is in the lockup state. In the step S72, a table comprising the dot-and-dash line of FIG. 18 is looked up from ΔN so as to calculate a gain KGZ2 during fuel recovery. The solid line in this figure shows the same KGZ1 as in FIG. 15.

In the step S73, KGZ2 is entered as the value of the gain KGZ1 during fuel recovery.

When the lag FLU=0 in the step S71, it is determined that the vehicle is not in the lockup state, the routine proceeds to the step S65 from the step S71, and KGZ1 is found from ΔN by looking up a table shown in FIG. 15 as in the aforesaid first embodiment. Unlike KGZ1, as shown in FIG. 18, KGZ2 has a positive value when the engine rotation speed decrease amount ΔN is large.

When fuel recovery is performed after rapid deceleration and the vehicle is in the lockup state, the generated torque increases more than in the case than when the vehicle is not in the lockup state as shown by the double dotted line in FIG. 16E. This means that engine rotation speed is quickly restored by performing fuel recovery after rapid deceleration even if there is a response delay from when the lockup release signal is output to when the lockup is actually released. The determination as to whether or not the automatic transmission is in the lockup state is performed by an automatic transmission control unit, not shown. The control unit 20 is so configured that it can receive the determining result, i.e. the flag FLU, via a communications device.

The automatic transmission control unit determines whether or not the vehicle running conditions are in the lockup area, for example by referring to the flowchart of FIG. 20.

Figure 21:
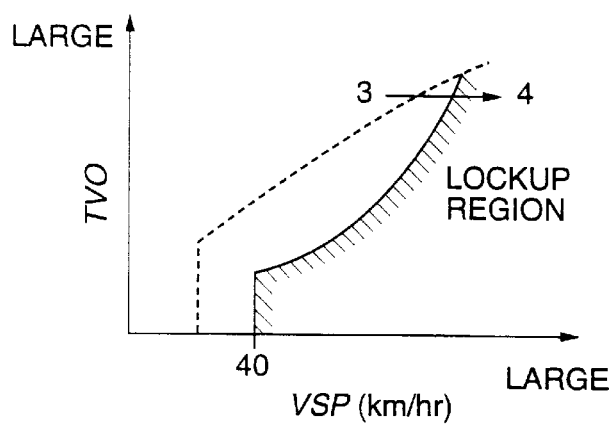
FIG. 21 is a diagram showing the contents of a map of the lock up region stored by the air-fuel ratio controller according to the second embodiment.

The lockup area may be specified on a map by a throttle opening TVO and the vehicle speed VSP as parameters, as shown in FIG. 21.

In a step S81, it is determined whether or not the vehicle is in the lockup state by looking up this map from TVO and VSP.

When the vehicle is in the lockup area, in a step S82, an ON signal is output to a lockup solenoid of the automatic transmission, and when the vehicle is not in the lockup area, an OFF signal is output to the lockup solenoid in a step S84. It should be noted that if the vehicle speed is 40 km/hr when the lockup release signal is output, the vehicle speed at which fuel recovery is started is set lower than this, as shown in FIG. 19C, so that the lockup release signal is output before fuel recovery is performed.

When the lockup signal is output in the step S82, the flag FLU is set to 1 in the step S83 and the routine is terminated. On the other hand, when the lockup release signal is output in the step S84, FLU is reset to 0 in a step S85.

The control unit 20 determines the value of this flag FLU which has been transmitted.

In the aforesaid first embodiment, KGZ1 is varied in three stages, i.e. −0.75, −0.25, 0, as shown in FIG. 18, but the number of stages may be increased if desired. Alternatively, KGZ1 may be set such that it varies continuously instead of discontinuously in a stepwise manner.

In the first embodiment, KGZ1≦0, however KGZ1 may be given a positive value if necessary as in the second embodiment so as to increase torque.

In the aforesaid description, it was stated that the three gains Gztw, Gztwp, Gztwm were given values according to the cooling water temperature Tw. Alternatively however, a wall flow adhesion part temperature may be predicted, and the gains Gztw, Gztwp, Gztwm varied according to this predicted temperature.

Also, in the aforesaid embodiments, the concept was introduced of a correction amount for a wall flow with a slow response and a correction amount for a wall flow with a fast response, however this invention may be applied also to a case where the wall flow correction is determined by another method. Further, this invention may be applied to an air-fuel ratio controller wherein a wall flow correction is not applied, provided that the controller performs fuel cut and fuel recovery control.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. An air-fuel ratio controller for controlling a fuel injection amount of a fuel injector of a vehicle engine, comprising:
   a sensor for detecting an engine rotation speed, and
   a microprocessor programmed to:
      stop fuel injection from said fuel injector under a predetermined condition,
      calculate an engine rotation speed decrease rate from said engine rotation speed,
      determine whether or not a predetermined fuel injection restart condition is satisfied after fuel injection has been stopped,
      set a restart injection amount to be larger the larger said decrease rate, and
      control said fuel injector when said fuel injection restart condition is satisfied so that injection is restarted with said restart injection amount.

2. An air-fuel ratio controller as defined in claim 1, wherein said controller further comprises an idle switch for detecting an engine idle running state and a sensor for detecting a vehicle speed, and said predetermined fuel injection restart condition comprises a case where the engine is in the idle running state and the vehicle speed is less than a predetermined value.

3. An air-fuel ratio controller as defined in claim 1, wherein said engine is coupled with an automatic transmission comprising a lockup mechanism for directly transferring an engine output torque to the transmission, and said microprocessor is further programmed to increase said restart fuel injection amount when said lockup mechanism is activated.

4. An air-fuel ratio controller for controlling a fuel injection amount of a fuel injector of a vehicle engine, said injector respectively injecting fuel to a plurality of cylinders in said engine, comprising:

a sensor for detecting an engine rotation speed, and
a microprocessor programmed to:
calculate a basic fuel injection amount of said fuel injector,
calculate a first correction amount related to a first wall flow,
calculate an engine load equivalent amount for a specific cylinder based on said basic injection amount,
calculate a variation rate of said engine load equivalent amount,
calculate a second correction amount related to a second wall flow having a faster response than the first wall flow, based on said variation rate,
calculate a cylinder-specific injection amount by correcting said basic injection amount by a first correction amount and a second correction amount,
control said fuel injector such that the cylinder-specific injection amount is injected for said cylinder in synchronism with the engine rotation,
stop the fuel injection by said fuel injector into said cylinder under a predetermined condition,
store said engine load equivalent amount immediately prior to when fuel injection is stopped in said cylinder,
decrease the stored engine load equivalent amount in a predetermined proportion with the fuel injection timing during the time that fuel injection is stopped,
determine whether or not a predetermined fuel injection restart condition is satisfied after fuel injection has stopped,
calculate said second correction amount from the difference between the present engine load equivalent amount and the stored engine load equivalent amount, when said fuel injection restart condition is satisfied,
calculate an engine rotation speed decrease rate when said fuel injection restart condition is satisfied,
modify said second correction amount such that said restart fuel injection amount decreases the smaller is said decrease rate,
calculate said restart fuel injection amount when said fuel injection restart condition is satisfied from said basic injection amount, said first correction amount and said modified second correction amount, and
control said fuel injector so that injection is restarted with said restart fuel injection amount.

5. An air-fuel ratio controller as defined in claim 4, wherein said controller further comprises an idle switch for detecting an engine idle running state and a sensor for detecting a vehicle speed, and said predetermined fuel injection restart condition comprises a case where the engine is in the idle running state and the vehicle speed has decreased to a predetermined or lower value.

6. An air-fuel ratio controller as defined in claim 4, wherein said engine is coupled with an automatic transmission comprising a lockup mechanism for directly transferring an engine output torque to the transmission, and said microprocessor is programmed to further increase said restart fuel injection amount when said lockup mechanism is activated.

7. An air-fuel ratio controller as defined in claim 4, wherein said controller further comprises a sensor for detecting an engine cooling water temperature, and said microprocessor is further programmed to correct said second correction amount based on said cooling water temperature.

8. An air-fuel ratio controller for controlling a fuel injection amount of a fuel injector of a vehicle engine, said injector respectively injecting fuel to a plurality of cylinders in said engine, comprising:

a sensor for detecting an engine rotation speed, and
a microprocessor programmed to:
calculate a basic fuel injection amount of said fuel injector,
control said fuel injector such that an injection amount based on said basic fuel injection amount is injected for each cylinder in synchronism with the engine rotation,
calculate an engine load equivalent amount for a specific cylinder based on said basic injection amount,
calculate a variation rate of said engine load equivalent amount,
determine whether or not said engine is in a rapid acceleration state based on said load variation rate,
calculate an asynchronous injection amount for said cylinder based on said load variation rate when said engine is in said rapid acceleration state,
control said fuel injector such that said asynchronous injection amount is injected immediately after said calculation of said asynchronous injection amount,
stop fuel injection from said fuel injector under a predetermined condition,
store said engine load equivalent amount immediately prior to when fuel injection is stopped,
decrease the stored engine load equivalent amount in a predetermined proportion with the fuel injection timing during the time that fuel injection is stopped,
determine whether or not a predetermined fuel injection restart condition is satisfied after fuel injection has stopped,
calculate said asynchronous injection amount from the difference between the present engine load equivalent amount and the stored engine load equivalent amount, when said fuel injection restart condition is satisfied,
calculate an engine rotation speed decrease rate when said fuel injection restart condition is satisfied, and
modify said asynchronous injection amount such that said asynchronous injection amount is decreased the smaller is said decrease rate.

9. An air-fuel ratio controller as defined in claim 8, wherein said microprocessor is further programmed to predict a correction amount for said cylinder comprising a wall flow decrease amount due to rapid acceleration of said engine added to a fuel oversupply amount due to said asynchronous injection after said rapid acceleration state, and subtract said correction amount from a synchronous injection amount performed immediately following said asynchronous injection.

10. An air-fuel ratio controller as defined in claim 8, wherein said controller further comprises an idle switch for detecting an engine idle running state and a sensor for detecting a vehicle speed, and said predetermined fuel injection restart condition comprises a case where the engine is in the idle running state and the vehicle speed has decreased to a predetermined or lower value.

11. An air-fuel ratio controller as defined in claim 8, wherein said engine is coupled with an automatic transmission comprising a lockup mechanism for directly transferring an engine output torque to the transmission, and said microprocessor is further programmed to increase said asynchronous injection amount when said lockup mechanism is activated.

12. An air-fuel ratio controller as defined in claim 8, wherein said controller further comprises a sensor for detecting an engine cooling water temperature, and said microprocessor is further programmed to correct said asynchronous injection amount based on said cooling water temperature.

13. An air-fuel ratio controller for controlling a fuel injection amount of a fuel injector of a vehicle engine, comprising:

means for detecting an engine rotation speed, means for stopping fuel injection from said fuel injector under a predetermined condition, means for determining whether or not a predetermined fuel injection restart condition is satisfied after fuel injection has been stopped, means for calculating an engine rotation speed decrease rate when said fuel injection restart condition is satisfied, means for setting a restart injection amount to be larger the larger said decrease rate, and means for controlling said fuel injector so that injection is restarted with said restart injection amount.

* * * * *